US010451145B2

(12) United States Patent
Chen et al.

(10) Patent No.: US 10,451,145 B2
(45) Date of Patent: Oct. 22, 2019

(54) SYSTEM AND DEVICE FOR WINDOW COVERING SYSTEM

(71) Applicant: Nien Made Enterprise Co., Ltd., Taichung (TW)

(72) Inventors: Lin Chen, Taichung (TW); Keng-Hao Nien, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 244 days.

(21) Appl. No.: 15/407,214

(22) Filed: Jan. 16, 2017

(65) Prior Publication Data
US 2017/0211320 A1 Jul. 27, 2017

Related U.S. Application Data

(60) Provisional application No. 62/342,289, filed on May 27, 2016, provisional application No. 62/326,020, (Continued)

(30) Foreign Application Priority Data

Jan. 22, 2016 (CN) ..................... 2016 2 0065142 U

(51) Int. Cl.
*E06B 9/00* (2006.01)
*F16F 15/18* (2006.01)
(Continued)

(52) U.S. Cl.
CPC ........... *F16F 15/18* (2013.01); *B65H 75/486* (2013.01); *E06B 9/307* (2013.01); *E06B 9/322* (2013.01);
(Continued)

(58) Field of Classification Search
CPC .......... E06B 9/322; E06B 9/325; E06B 9/324; E06B 9/80; E06B 9/90; E06B 9/307;
(Continued)

(56) References Cited

U.S. PATENT DOCUMENTS 3,965,960 A * 6/1976 Massey ..................... A47K 3/38
160/295
4,427,050 A * 1/1984 Toppen ..................... E06B 9/60
160/315
(Continued)

FOREIGN PATENT DOCUMENTS

AU 782302 B2 7/2005
AU 2012370499 A1 9/2014
(Continued)

*Primary Examiner* — Johnnie A. Shablack
(74) *Attorney, Agent, or Firm* — Muncy, Geissler, Olds & Lowe, P.C.

(57) ABSTRACT

A damping adjustment device for adjusting a damping force to a window covering system while the window covering system is expanding, wherein the damping adjustment device comprises a damping module comprising first and second damping units. The damping force is outputted by the damping module to the window covering system when the first and second damping units generate an interaction force in between by a relative motion therebetween. An adjusting module is connected to the damping module for operating with the damping module simultaneously, wherein the damping force from the damping module is adjusted by the adjusting module altering a relative position of the first damping unit and the second damping unit when the relative motion occurs therebetween. A window covering system comprises the damping adjustment device, wherein expansion speed of a covering material of the window covering system can be effectively controlled and adjusted by the damping adjustment device.

31 Claims, 14 Drawing Sheets

Related U.S. Application Data filed on Apr. 22, 2016, provisional application No. 62/318,771, filed on Apr. 6, 2016.

(51) Int. Cl.
| | |
|---|---|
| *E06B 9/322* | (2006.01) |
| *B65H 75/48* | (2006.01) |
| *E06B 9/307* | (2006.01) |
| *E06B 9/324* | (2006.01) |
| *F16F 9/12* | (2006.01) |
| *E06B 9/388* | (2006.01) |
| *E06B 9/80* | (2006.01) |

(52) U.S. Cl.
CPC .............. *E06B 9/324* (2013.01); *F16F 9/125* (2013.01); *E06B 9/388* (2013.01); *E06B 2009/3222* (2013.01); *E06B 2009/807* (2013.01); *F16F 2222/04* (2013.01); *F16F 2222/06* (2013.01); *F16F 2222/12* (2013.01); *F16F 2224/025* (2013.01); *F16F 2224/045* (2013.01)

(58) Field of Classification Search
CPC ........ E06B 9/84; E06B 9/88; E06B 2009/807; E06B 9/56; E06B 9/62; F16F 15/18; F16F 9/125; F16F 2222/06; F16F 2224/045
See application file for complete search history.

(56) References Cited

U.S. PATENT DOCUMENTS

| | | | | |
|---|---|---|---|---|
| 4,429,729 | A * | 2/1984 | Winslow | E06B 9/60 144/193.1 |
| 4,466,475 | A * | 8/1984 | Saito | E06B 9/90 160/297 |
| 4,498,517 | A * | 2/1985 | Mase | E06B 9/82 160/294 |
| 4,513,805 | A * | 4/1985 | Mase | E06B 9/80 160/299 |
| 4,523,620 | A * | 6/1985 | Mortellite | E06B 9/60 160/315 |
| 4,681,279 | A | 7/1987 | Nakamura | |
| 5,123,472 | A | 6/1992 | Nagashima et al. | |
| 5,167,269 | A * | 12/1992 | Abo | E06B 9/90 160/305 |
| 5,437,324 | A * | 8/1995 | Sternquist | E06B 9/44 160/299 |
| 6,129,131 | A | 10/2000 | Colson | |
| 6,155,328 | A | 12/2000 | Welfonder | |
| 6,168,107 | B1 * | 1/2001 | Bishop | B65H 75/4442 242/381 |
| 6,332,491 | B1 | 12/2001 | Rossini | |
| 6,378,594 | B1 * | 4/2002 | Yamanaka | E06B 9/80 160/238 |
| 6,443,210 | B1 * | 9/2002 | Welfonder | E06B 9/42 160/296 |
| 6,467,714 | B1 * | 10/2002 | Rasmussen | E06B 9/44 160/296 |
| 6,666,252 | B2 * | 12/2003 | Welfonder | E06B 9/42 160/296 |
| 6,715,528 | B2 | 4/2004 | Rossini | |
| 6,749,142 | B2 * | 6/2004 | Arisaka | B60R 5/047 160/296 |
| 6,924,615 | B2 * | 8/2005 | Cavarec | E06B 9/32 310/152 |
| 6,938,667 | B2 * | 9/2005 | Sugiyama | E06B 9/54 160/296 |
| 6,948,544 | B2 | 9/2005 | Nien | |
| 6,955,207 | B2 | 10/2005 | Minder | |
| 7,198,089 | B2 | 4/2007 | Hsu | |
| 7,234,503 | B2 * | 6/2007 | Kwak | E06B 9/42 160/295 |
| 7,259,485 | B2 * | 8/2007 | Cavarec | E06B 9/80 160/168.1 P |
| 7,331,370 | B1 * | 2/2008 | Militello | E06B 9/322 160/170 |
| 7,341,091 | B2 | 3/2008 | Nien | |
| 7,360,736 | B2 * | 4/2008 | Zangirolami | E06B 9/54 160/296 |
| 7,406,995 | B2 | 8/2008 | Huang | |
| 7,461,683 | B2 * | 12/2008 | Wang | E06B 9/44 160/291 |
| 7,549,458 | B2 * | 6/2009 | Kwak | E06B 9/42 160/319 |
| 7,578,334 | B2 | 8/2009 | Smith et al. | |
| 7,717,154 | B2 | 5/2010 | Cheng | |
| 8,051,960 | B2 * | 11/2011 | Nakajima | E06B 9/80 160/299 |
| 8,186,413 | B2 * | 5/2012 | Fujita | E06B 9/34 160/121.1 |
| 8,210,230 | B2 * | 7/2012 | Glasl | B60J 1/2033 160/313 |
| 8,230,896 | B2 | 7/2012 | Anderson | |
| 8,267,145 | B2 | 9/2012 | Anderson | |
| 8,281,846 | B2 * | 10/2012 | Zhu | E06B 9/42 160/168.1 R |
| 8,511,364 | B2 * | 8/2013 | Anderson | E06B 9/262 160/84.05 |
| 8,556,204 | B2 * | 10/2013 | Kao | E06B 9/42 242/381 |
| 8,820,385 | B2 * | 9/2014 | Wu | E06B 9/322 160/170 |
| 8,950,461 | B2 * | 2/2015 | Adams | E06B 9/32 160/84.02 |
| 9,062,492 | B2 | 6/2015 | Yu | |
| 9,062,494 | B2 * | 6/2015 | Chen | E06B 9/60 |
| 9,127,500 | B2 | 9/2015 | Huang | |
| 9,194,176 | B2 * | 11/2015 | Chen | E06B 9/42 |
| 9,284,774 | B2 | 3/2016 | Yu et al. | |
| 9,322,214 | B2 * | 4/2016 | Bohlen | E06B 9/88 |
| 9,341,020 | B1 * | 5/2016 | Kao | E06B 9/262 |
| 9,523,236 | B2 * | 12/2016 | Bergamaschi | E06B 9/42 |
| 9,593,530 | B1 * | 3/2017 | Anthony | E06B 9/80 |
| 9,631,425 | B2 * | 4/2017 | Campagna | E06B 9/60 |
| 9,689,202 | B2 * | 6/2017 | Lin | B60J 1/2033 |
| 9,702,187 | B2 * | 7/2017 | Holt | E06B 9/262 |
| 9,739,089 | B2 * | 8/2017 | Smith | E06B 9/60 |
| 9,765,568 | B2 * | 9/2017 | Colson | E06B 9/42 |
| 9,816,317 | B2 * | 11/2017 | Chen | E06B 9/42 |
| 9,903,158 | B2 * | 2/2018 | Guan | E06B 9/307 |
| 9,988,837 | B2 * | 6/2018 | Defenbaugh | E06B 9/322 |
| 10,107,032 | B2 * | 10/2018 | Chen | E06B 9/34 |
| 2003/0221799 | A1 * | 12/2003 | Cross | E06B 9/322 160/168.1 P |
| 2005/0087394 | A1 * | 4/2005 | Toti | E06B 9/322 185/37 |
| 2006/0000561 | A1 * | 1/2006 | Anderson | E06B 9/262 160/168.1 R |
| 2009/0078380 | A1 | 3/2009 | Cheng | |
| 2009/0120592 | A1 | 5/2009 | Lesperance | |
| 2011/0005694 | A1 * | 1/2011 | Ng | E06B 9/44 160/311 |
| 2011/0024064 | A1 * | 2/2011 | Ng | E06B 9/42 160/317 |
| 2011/0290429 | A1 | 12/2011 | Cheng | |
| 2012/0168099 | A1 * | 7/2012 | Anderson | E06B 9/84 160/368.1 |
| 2013/0037225 | A1 | 2/2013 | Huang | |
| 2013/0062024 | A1 * | 3/2013 | Huang | E06B 9/50 160/127 |
| 2013/0087415 | A1 | 4/2013 | Hsieh | |
| 2014/0083631 | A1 | 3/2014 | Huang | |
| 2014/0131502 | A1 | 5/2014 | Zhu | |
| 2014/0291431 | A1 | 10/2014 | Huang | |
| 2015/0059992 | A1 | 3/2015 | Liu | |
| 2015/0136336 | A1 | 5/2015 | Huang | |
| 2015/0211296 | A1 | 7/2015 | Zhang et al. | |
| 2015/0285000 | A1 * | 10/2015 | Liu | E06B 9/80 242/396 |

(56) References Cited

U.S. PATENT DOCUMENTS

| | | | |
|---|---|---|---|
| 2015/0354275 A1 | 12/2015 | Huang et al. | |
| 2015/0368968 A1 | 12/2015 | Smith | |
| 2016/0130866 A1* | 5/2016 | Buccola, Jr. | E06B 9/322 185/9 |
| 2016/0222727 A1* | 8/2016 | Schiraldi | E06B 9/80 |
| 2017/0138123 A1* | 5/2017 | Chen | E06B 9/304 |
| 2017/0211319 A1* | 7/2017 | Wei | E06B 9/322 |
| 2017/0211320 A1* | 7/2017 | Chen | E06B 9/322 |
| 2017/0211321 A1* | 7/2017 | Chen | E06B 9/322 |
| 2017/0211657 A1* | 7/2017 | Chen | E06B 9/322 |
| 2017/0218703 A1* | 8/2017 | Wei | E06B 9/34 |
| 2017/0260804 A1* | 9/2017 | Wu | E06B 9/322 |
| 2017/0298691 A1* | 10/2017 | Yamagishi | E06B 9/304 |
| 2018/0106107 A1* | 4/2018 | Smith | E06B 9/42 |
| 2018/0179812 A1* | 6/2018 | Dubina | E06B 9/42 |
| 2018/0259033 A1* | 9/2018 | Basutto | E06B 9/322 |

FOREIGN PATENT DOCUMENTS

| | | |
|---|---|---|
| CA | 2805798 A1 | 8/2014 |
| CN | 101021139 B | 7/2010 |
| CN | 103161399 A | 6/2013 |
| CN | 202990802 U | 6/2013 |
| CN | 204552565 U | 8/2015 |
| DE | 202007002787 U1 | 7/2008 |
| DE | 102008010675 A1 | 9/2008 |
| JP | H04250287 A | 9/1992 |
| JP | 1993018168 A | 1/1993 |
| JP | H0726600 U | 5/1995 |
| JP | 2000145328 A | 5/2000 |
| JP | 2000220369 A | 8/2000 |
| JP | 2001008407 A | 1/2001 |
| JP | 2001317279 A | 11/2001 |
| JP | 3261106 B2 | 2/2002 |
| JP | 3378813 B2 | 2/2003 |
| JP | 3442670 B2 | 9/2003 |
| JP | 3485164 B2 | 1/2004 |
| JP | 2008013950 A | 1/2008 |
| JP | 4074420 B2 | 4/2008 |
| JP | 2008150856 A | 7/2008 |
| JP | 2013072183 A | 4/2013 |
| JP | 2013072224 A | 4/2013 |
| JP | 2015161147 A | 9/2015 |
| JP | 2015180810 A | 10/2015 |
| JP | 2015227604 A | 12/2015 |
| TW | I246415 B | 1/2006 |
| TW | M305849 U | 2/2007 |
| TW | I463961 B | 12/2014 |
| WO | 2010125951 A1 | 11/2010 |
| WO | 2016009881 A1 | 1/2016 |

* cited by examiner

US 10,451,145 B2

SYSTEM AND DEVICE FOR WINDOW COVERING SYSTEM

CROSS REFERENCE TO RELATED APPLICATION

This application claims priority from China Application Serial No. 201620065142.0 filed Jan. 22, 2016, U.S. Provisional Application Ser. No. 62/318,771 filed Apr. 6, 2016, U.S. Provisional Application Ser. No. 62/342,289 filed May 27, 2016, and U.S. Provisional Application Ser. No. 62/326,020 filed Apr. 22, 2016.

FIELD OF THE DISCLOSURE

The present disclosure relates generally to a window covering system. More specifically, the present disclosure relates to a window covering system with a damping adjustment device.

BACKGROUND OF THE DISCLOSURE

Traditionally, a window covering system includes a headrail, a covering material, a bottom rail and a driving device. The covering material is positioned between the headrail and the bottom rail. The driving device is positioned within the headrail and connected to the bottom rail for driving the bottom rail closer to or further from the headrail in order to expand or collect the covering material.

A downward force due to the weight of the bottom rail and the covering material urges rotational speed of the driving device to increase while the covering material is expanding, whereby causing wearing of mechanical parts in the window covering system or causing the bottom rail to directly hit the object or user located under the bottom rail.

BRIEF SUMMARY OF THE DISCLOSURE

In view of the foregoing subject, a general objective of the present disclosure is to provide a window covering system which can slow down the covering material during expansion. More specifically, the window covering system comprises a damping adjustment device which increases safety of the window covering system as well as reduces wearing of mechanical parts in the window covering system.

Therefore, the present disclosure provides a damping adjustment device for adjusting a damping force outputted to a window covering system while the window covering system is expanding. The damping adjustment device comprises a damping module which comprises a first damping unit and a second damping unit, and the damping force is outputted by the damping module to the window covering system when the first damping unit and the second damping unit generate an interaction force in between by a relative motion between the first damping unit and the second damping unit, and an adjusting module connected to the damping module for operating with the damping module simultaneously, wherein the damping force from the damping module is adjusted by the adjusting module altering a relative position of the first damping unit and the second damping unit when the relative motion occurs between the first damping unit and the second damping unit.

In addition, the present disclosure provides a window covering system, which comprises a covering material, a driving device to be driven by the covering material while the covering material is expanding or collecting, a damping adjustment device connected to the driving device, wherein the damping adjustment device comprises a damping module and an adjusting module, wherein the damping module is configured to output a damping force to the driving device, and the damping module comprises a first damping unit and a second damping unit, wherein the first damping unit and the second damping unit are configured to generate an interaction force in between by a relative motion between the first damping unit and the second damping unit while the driving device is driven by the expansion of the covering material, and the adjusting module is connected to the damping module and the driving device, wherein the adjusting module is configured to operate with the damping module simultaneously for adjusting the damping force to the driving device by altering a relative position of the first damping unit and the second damping unit when the relative motion occurs between the first damping unit and the second damping unit.

Comparing to the traditional window covering system, the window covering system of the present disclosure can adjust the expanding speed of the covering material via the damping adjustment device.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, wherein.

In accordance with common practice, the various described features are not drawn to scale and are drawn to emphasize features relevant to the present disclosure. Like reference characters denote like elements throughout the figures and text.

DETAILED DESCRIPTION OF THE DISCLOSURE

Figure 1:
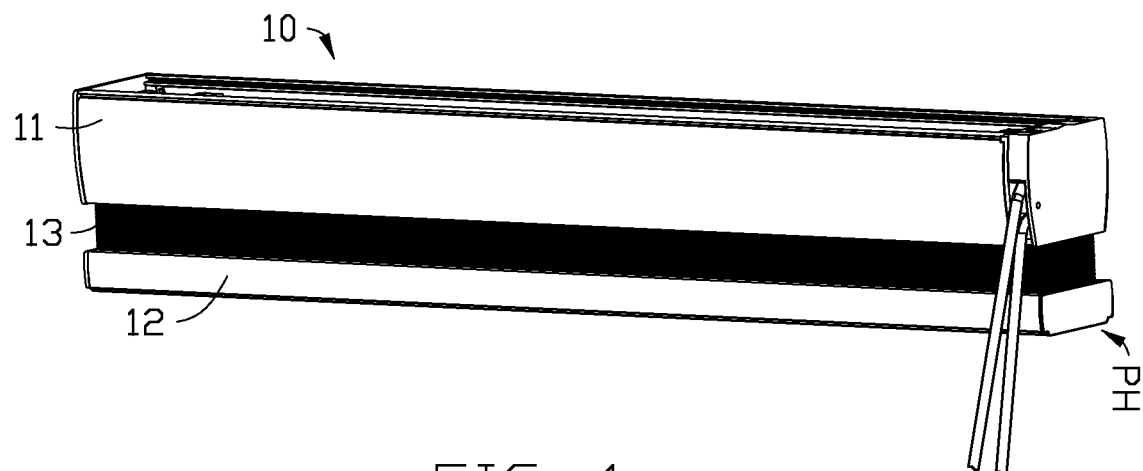
FIG. 1 is a schematic illustration of a window covering system in a collected state according to one embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present disclosure in conjunction with the accompanying drawings in FIGS. 1 to 26. Reference will be made to the drawing figures to describe the present disclosure in detail, wherein depicted elements are not necessarily shown to scale and wherein like or similar elements are designated by same or similar reference numeral through the several views and same or similar terminology.

Figure 2:
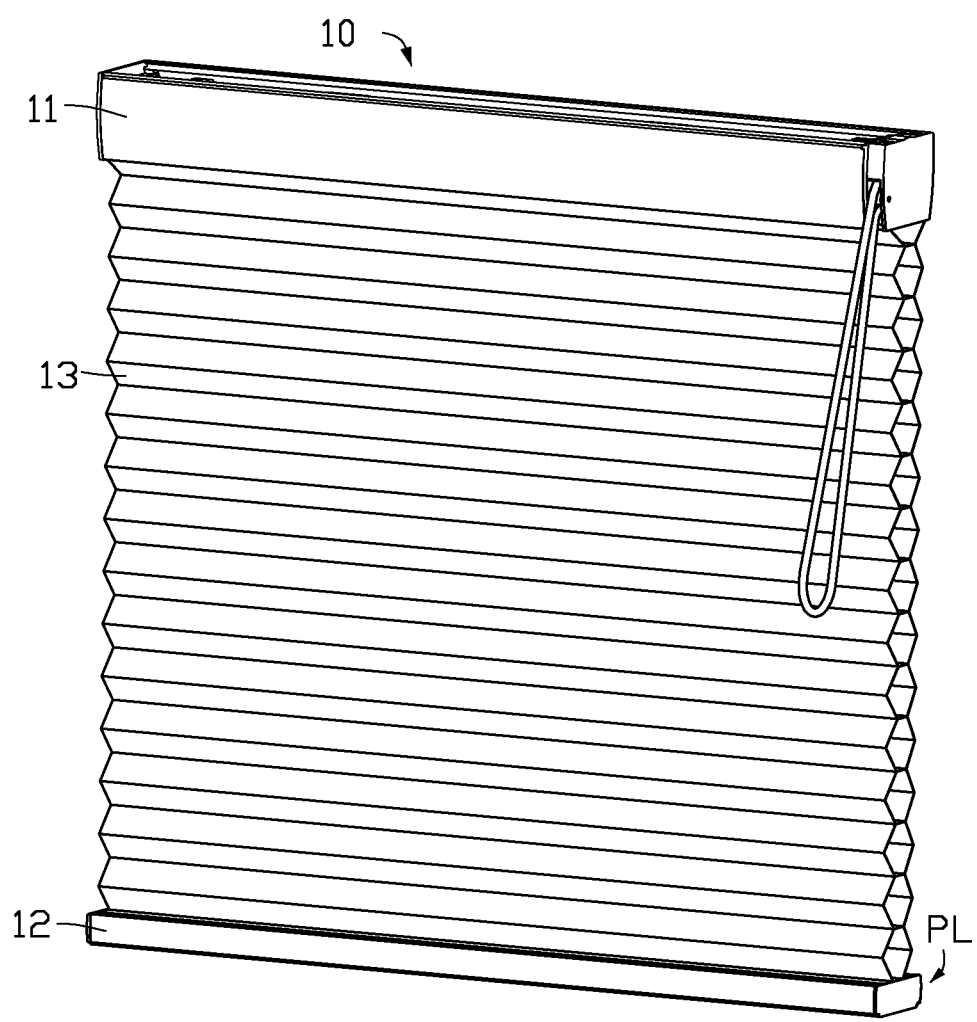
FIG. 2 is a schematic illustration of the window covering system in an expanded state.

FIG. 1 is a schematic illustration of a window covering system 10 in a collected state according to one embodiment of the present disclosure. The window covering system 10 comprises a headrail 11, a bottom rail 12, and a covering material 13 which is positioned between the headrail 11 and the bottom rail 12, wherein the covering material 13 is in the collected state. At the same time, the bottom rail 12 is at high position (PH). FIG. 2 is a schematic illustration of the window covering system 10 in an expanded state, wherein the covering material 13 is in the expanded state. In the expanded state, the covering material 13 extends downwardly from the headrail 11, and thus the bottom rail 12 is at low position (PL).

Figure 3:
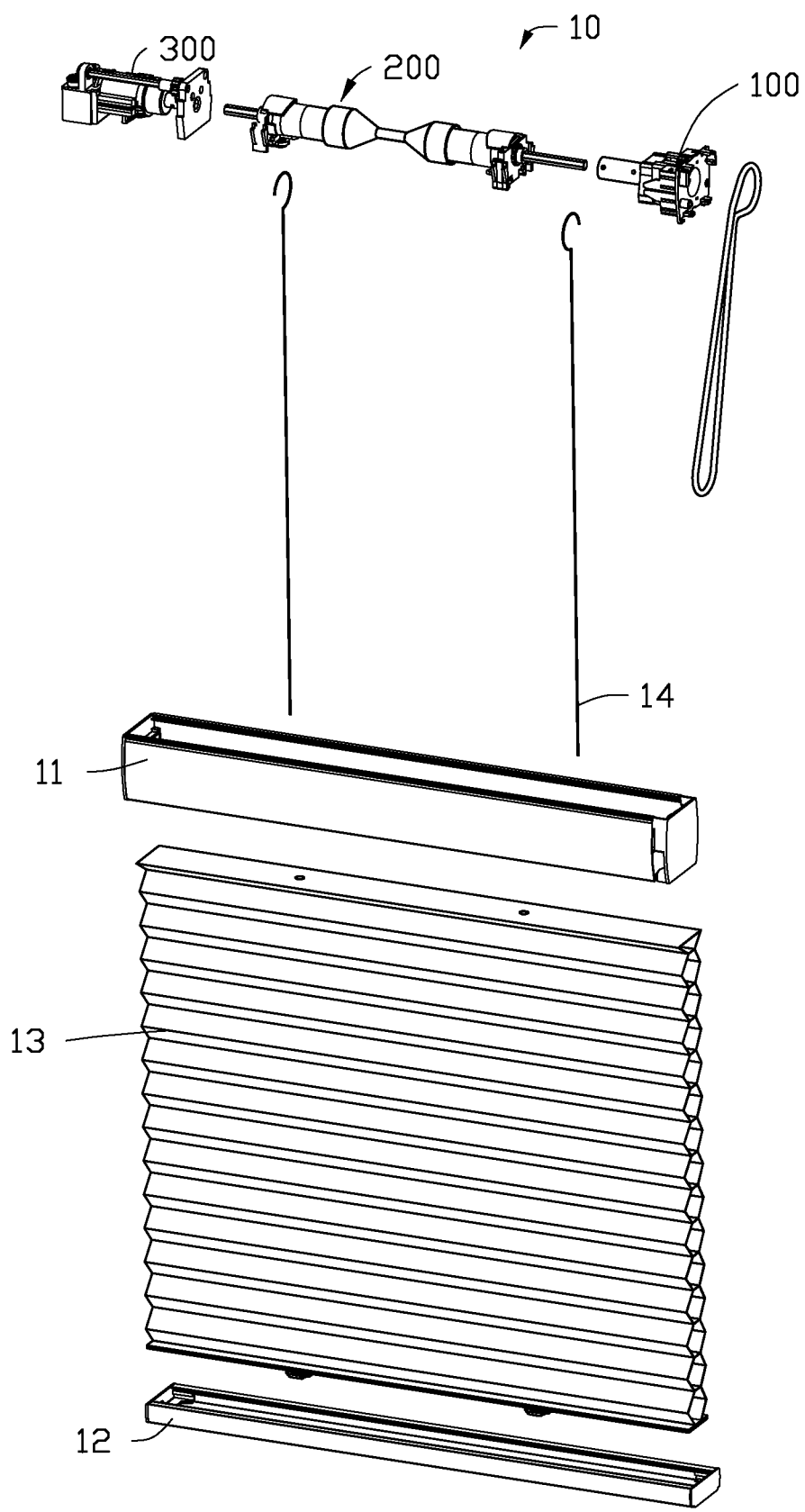
FIG. 3 is an exploded illustration of the window covering system.
Figure 4:
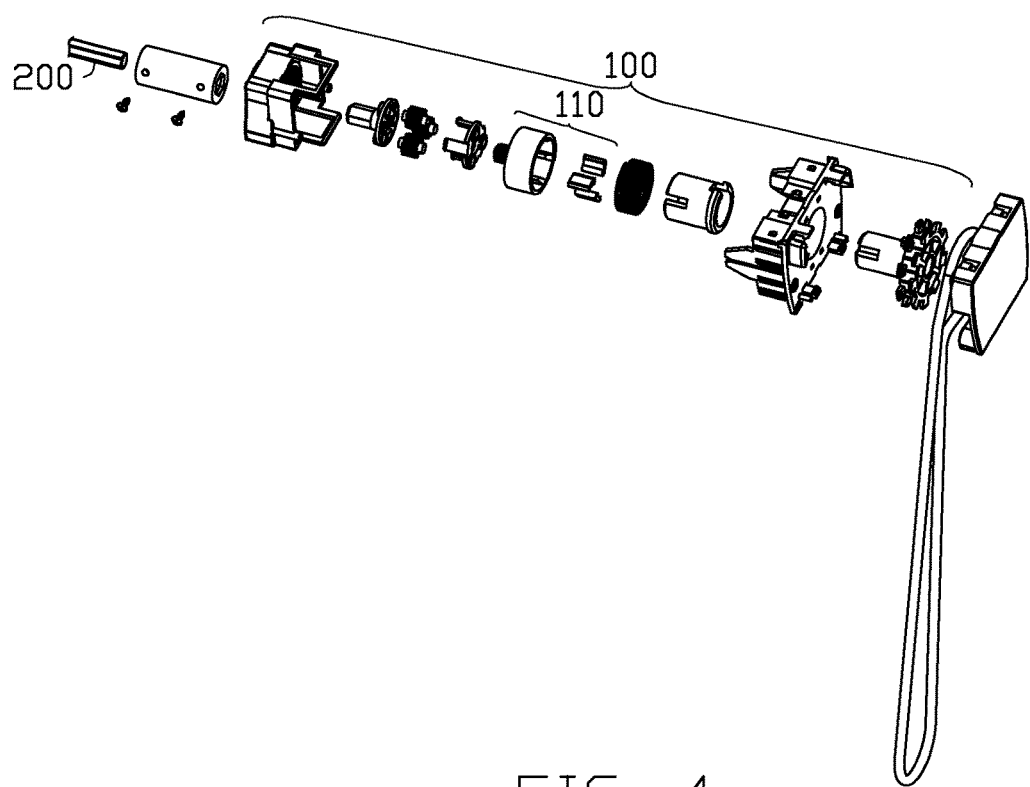
FIG. 4 is an exploded illustration of a control device in the window covering system.

FIG. 3 is an exploded illustration of the window covering system 10. The window covering system 10 further comprises a control device 100, a driving device 200 and a damping adjustment device 300. The driving device 200 comprises two ends, wherein one end is connected with the control device 100, and the other end is connected with the damping adjustment device 300. It should be noted that, connection between the control device 100, the driving device 200 and the damping adjustment device 300 is not limited to the above, whereby one can be directly or indirectly connected to the others. Referring to FIG. 4, the control device 100 comprises a locking assembly 110 which is connected to the driving device 200 for locking the driving device 200. Therefore, the driving device 200 is not operable when the locking assembly 110 is in a locking state; the driving device 200 can operate freely when the locking assembly 110 is in an unlock state after a user actuated the locking assembly 110. In FIG. 4, the control device 100 and the locking assembly 110 are standard configurations in any embodiment of the present disclosure but a subject of the present disclosure. Therefore, the control device 100 and the locking assembly 110 are not to be described in detail here. Any further detail about the control device 100 and the locking assembly 110 should be referred to U.S. patent application Ser. No. 15/184,802.

Referring back to FIG. 3, the window covering system 10 further comprises a lift cord 14 with two ends, wherein one end of the lift cord 14 is fixed to the bottom rail 12, and the other end of the lift cord 14 is connected to the driving device 200 through the covering material 13. In one embodiment of the present disclosure, the driving device 200 comprises a cord collecting shaft or cord collecting wheel, so the lift cord 14 can be collected by the driving device 200. Thus, in one embodiment of the present disclosure, after the locking assembly 110 is released to unlock the driving device 200, the bottom rail 12 is dropped by gravity with or without additional weight from the covering material 13. At the same time, the lift cord 14 fixed to the bottom rail 12 is dragged by the bottom rail 12, whereby the driving device 200 is put into operation. In one embodiment of the present disclosure, the driving device 200 rotates when the lift cord 14 is dragged by the bottom rail 12. In one embodiment of the present disclosure, the driving device 200 can a cord collecting wheel, a cord collecting shaft or any other means with cord collecting function, for example, a reel, a scroll or a spool.

Figure 5:
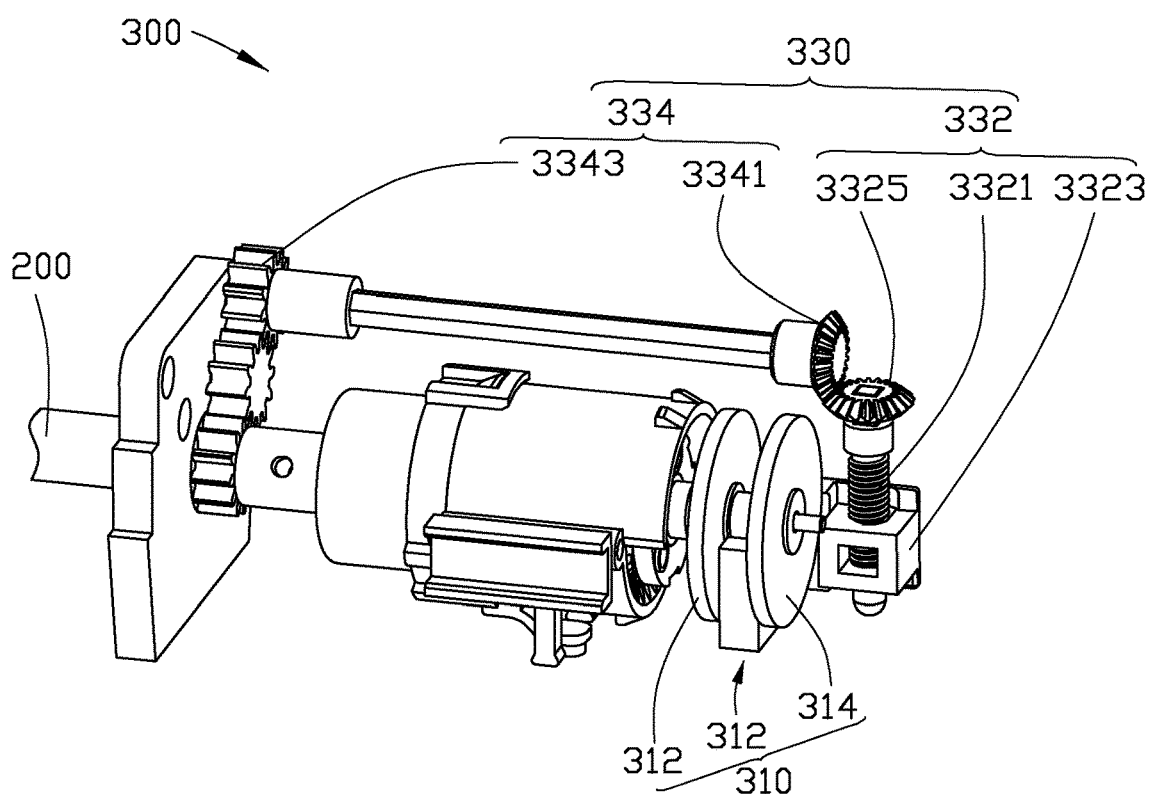
FIG. 5 is an schematic illustration of a damping adjustment device according to one embodiment of the present disclosure.

Referring to FIG. 3, FIG. 4 and FIG. 5, the driving device 200 is connected with the damping adjustment device 300. When the driving device 200 is in operation, the damping adjustment device 300 outputs a damping force to the driving device 200 for slowing the operational speed of the driving device 200, and hence the dropping speed of the bottom rail 12 is slowed. Therefore, in the present disclosure, the covering material 13 connected to the bottom rail 12 expands slower than a window covering system without the damping adjustment device 300.

However, regardless of the rotational speed of the driving device 200 or the dropping speed of the bottom rail 12, both are changed by the magnitude of the damping force from the damping adjustment device 300. That is, the greater the damping force from the damping adjustment device 300, the slower the rotational speed of the driving device 200 and expanding speed of the covering material 13; on the contrary, the smaller the damping force from the damping adjustment device 300, the faster the rotational speed of the driving device 200 and the expanding speed of the covering material 13. It should be noted that the damping force from the damping adjustment device 300 of the present disclosure can be realized by various technical means, for example, any damping module which can output at least a physical force, such as magnetic force, frictional force, viscous force of a fluid or electrostatic force, to generate the damping force.

Referring to the damping adjustment device 300 in FIG. 2, FIG. 3 and FIG. 5, the damping adjustment device 300 comprises a damping module 310 and an adjusting module 330, wherein the damping module 310 is connected to the adjusting module 330 for operating simultaneously with the adjusting module 330. The damping module 310 comprises a first damping unit 312 and a second damping unit 314. When the damping module 310 operates, a relative motion occurs between the first damping unit 312 and the second damping unit 314, whereby an interaction force is generated between the first damping unit 312 and the second damping unit 314. Therefore, the damping module 310 outputs the damping force to the driving device 200, and thus acting upon the covering material 13 of the window covering system 10 while the covering material 13 is expanding. On the other hand, due to the simultaneous operation of the damping module 310 and the adjusting module 330, the adjusting module 330 operates together with the damping module 310 for altering a relative position of the first damping unit 312 and the second damping unit 314, and thus the interaction force between the first damping unit 312 and the second damping unit 314 changes. Therefore, the damping force from the damping module 310 to the driving device 200 is adjusted.

In short, in one embodiment of the present disclosure, while the covering material 13 is expanding, the driving device 200 is driven to operate thus the damping module 310 outputs the damping force to the driving device 200. While the driving device 200 is operating, the adjusting module 330 reduces the interaction force between the first damping unit 312 and the second damping unit 314 and thus the damping force outputted by the damping module 310 to the driving device 200 is reduced. In another embodiment of the present disclosure, the driving device is connected to an upper end of the covering material. When the covering material driving the driving device to operate, the damping module outputs the damping force to the driving device. While the driving device is operating, the adjusting module increases the interaction force between the first damping unit and the second damping unit and thus the damping force outputted by the damping module to the driving device is increased.

Figure 6:
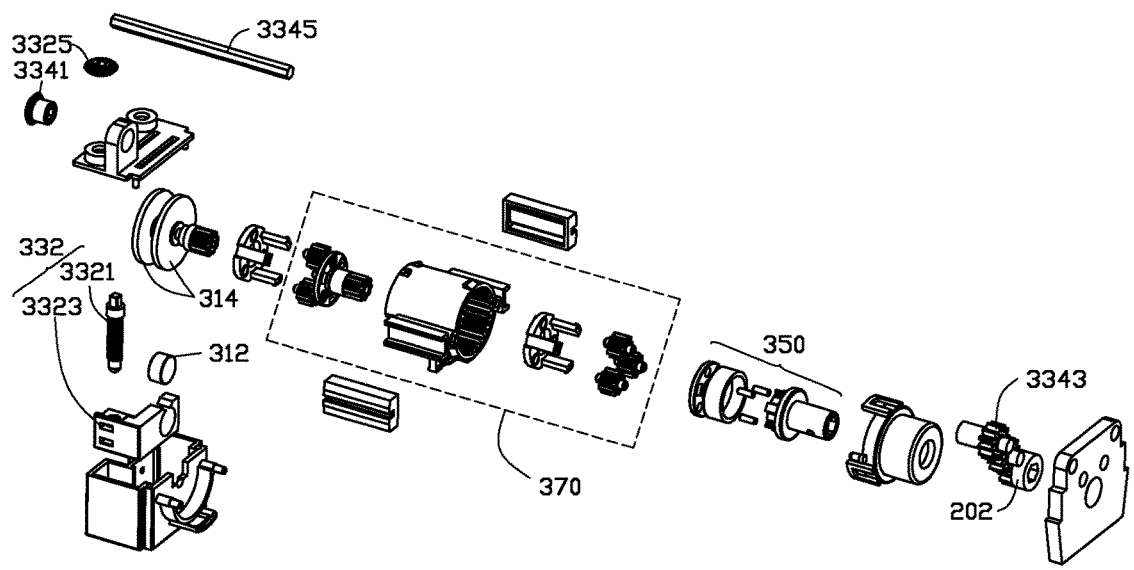
FIG. 6 is an exploded illustration of the damping adjustment device.

In FIG. 5 and FIG. 6, the adjusting module 330 comprises a shifting assembly 332 which is connected to the first damping unit 312. The first damping unit 312 is configured to be moved by the shifting assembly 332 for altering the relative position of the first damping unit 312 and the second damping unit 314. With respect to the window covering system 10, the shifting assembly 332 is connected to the driving device 200 for operating simultaneously with the driving device 200 in order to move the first damping unit 312. In addition, the shifting assembly 332 moves the first damping unit 312 along a shifting axis 3324 of the shifting assembly 332 in an axial direction of the shifting axis 3324 for altering the relative position of the first damping unit 312 and the second damping unit 314.

Various embodiments of the present disclosure regarding technical features, structures and linkage will be explained with respect to the damping adjustment device 300, damping adjustment device 400 and damping adjustment device 500. In any embodiment of the present disclosure, the damping adjustment module can connect to the first damping unit and the second damping unit for operating simultaneously with the first damping unit and the second damping unit. Alternatively, the damping adjustment module can only connect to the first damping unit for operating simultaneously with the first damping unit.

Figure 7:
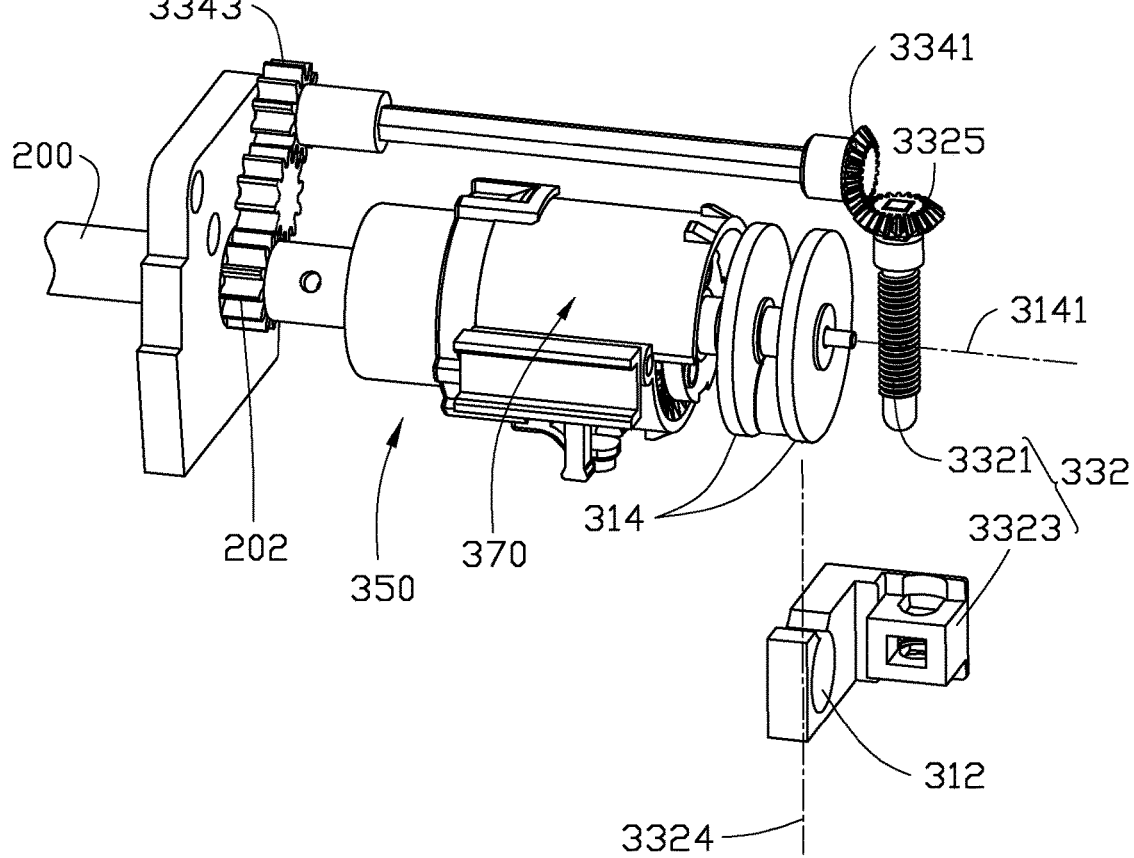
FIG. 7 is a partially exploded illustration of the damping adjustment device.

FIG. 5 to FIG. 12 are illustrations for the damping adjustment device 300 according to one embodiment of the present disclosure. In FIG. 5, FIG. 6 and FIG. 7, the damping adjustment device 300 comprises a damping module 310 and an adjusting module 330, wherein the damping module 310 comprises a first damping unit 312 and a second damping unit 314. The adjusting module 330 is connected to the first damping unit 312 and the second damping unit 314 for operating simultaneously with the first damping unit 312 and the second damping unit 314.

The adjusting module 330 comprises a shifting assembly 332 which comprises a threaded rod 3321 and a nut 3323 coupled to the threaded rod 3321 by threaded engagement. When the threaded rod 3321 rotates, the nut 3312 is driven by the threaded rod 3321 to move along a rotation axis of the threaded rod 3321 in an axial direction of the rotation axis, and the first damping unit 312 connected to the nut 3323 moves simultaneously with the nut 3323 along a shifting axis 3324, wherein the shifting axis 3324 is substantially parallel to the rotation axis of the threaded rod 3321.

The second damping unit 314 of the damping module 310 comprises a rotation axis 3141 which the second damping unit 314 rotates about. The rotation axis 3141 of the second damping module 314 is substantially perpendicular to the shifting axis 3324 of the shifting assembly. With respect to the window covering system 10, the driving device 200 can further comprise a driving axis which is substantially perpendicular to the shifting axis 3324. When the shifting assembly 332 operates simultaneously with the second damping unit 314, the first damping unit 312 is moved relative to the second damping unit 314 by the shifting assembly 332, whereby the interaction force between the first damping unit 312 and the second damping unit 314 is changed. To be more specific, the second damping unit 314, the shifting assembly 332 and the driving device 200 are connected to each other, and thus the damping unit 314 and the shifting assembly 332 operate simultaneously with the driving device 200. Therefore, the shifting assembly 332 moves the first damping unit 312 relative to the second damping unit 314 while the driving device 200 is driving the second damping unit 314 to rotate, whereby the interaction force between the first damping unit 312 and the second damping unit 314 is changed.

Figure 8:
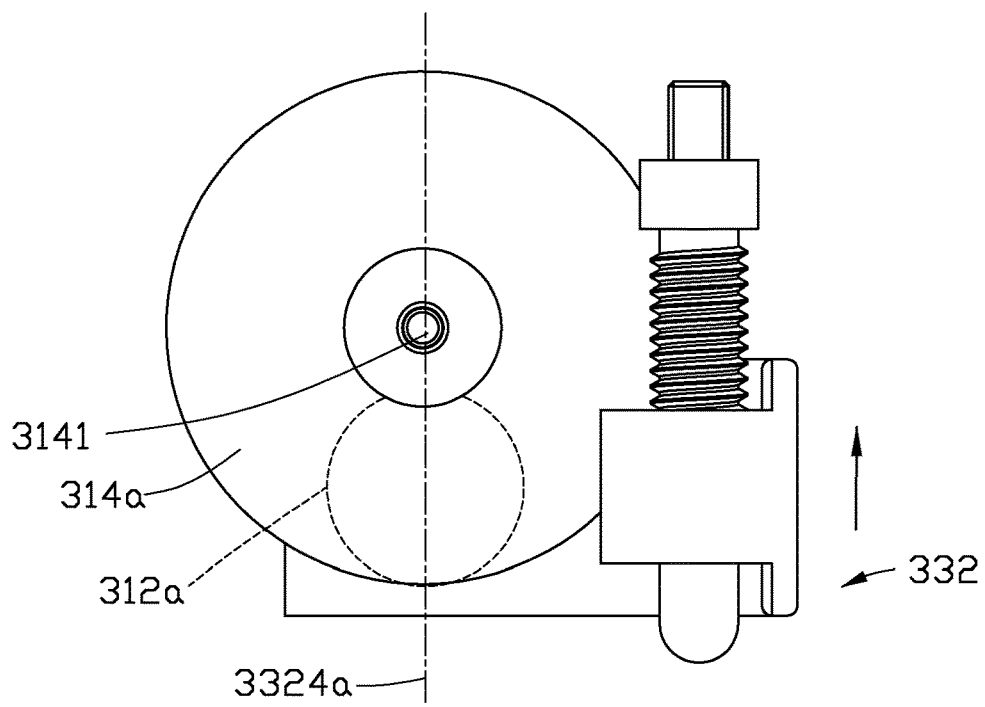
FIG. 8 and FIG. 9 are partial schematic illustrations of the damping adjustment device in different operation state.
Figure 9:
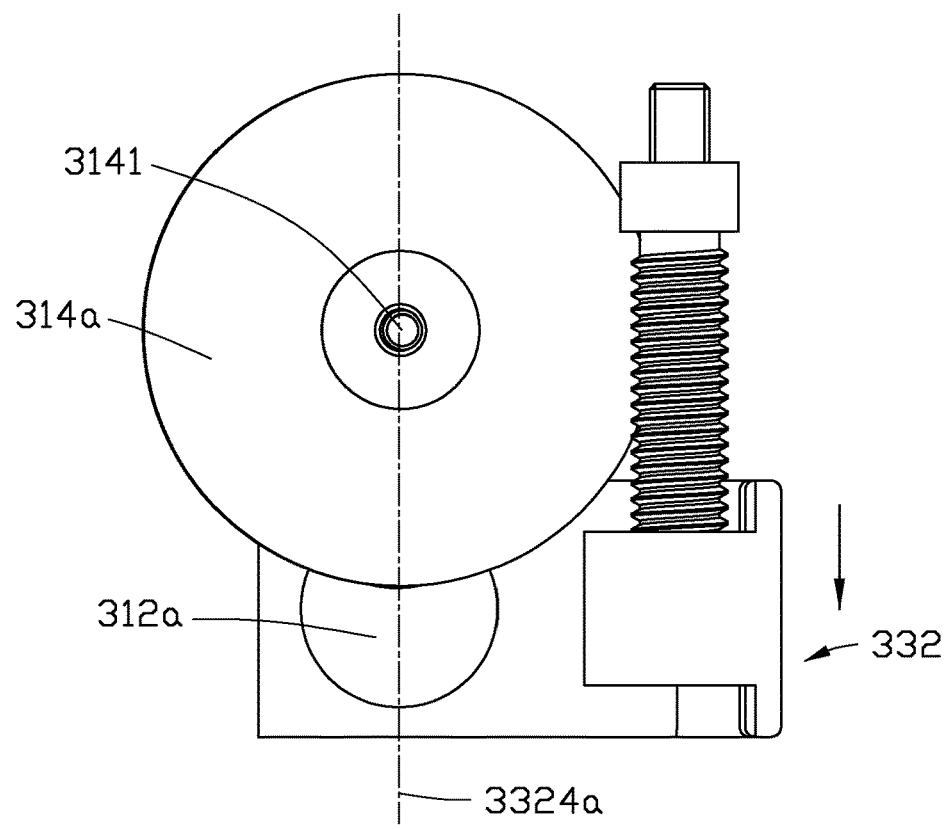

Referring to FIG. 8 and FIG. 9, the first damping unit 312 is exemplified by a magnetic unit 312a, wherein the magnetic unit 312 can be a magnet or an electromagnet; the second damping unit 314 is exemplified by a conductive unit 314a, wherein the conductive unit 314a can be a conductive disk which can generate an electromagnetic induction force with the magnetic unit 312a, such as an aluminum disk or a copper disk. When the magnetic unit 312a moves relative to the conductive unit 314a, the electromagnetic induction force is generated between the magnetic unit 314a and the conductive unit 314a, and the adjusting module 330 alters the relative position of the magnetic unit 312a and the conductive unit 314a for changing the electromagnetic induction force. It should be noted that, the shape and size of the magnetic unit 312a and the conductive unit 314a are only illustrated as an example and not intended to limit the scope of the present disclosure. In another embodiment of the present disclosure, the first damping unit can be the conductive unit, and the second damping unit can be the magnetic unit.

Referring to FIG. 7, FIG. 8 and FIG. 9, the shifting assembly 332 moves the first damping unit 312 relative to the second damping unit 314 in an radial direction of the rotation axis 3141 of the second damping unit 314 for changing the interaction force between the first damping unit 312 and the second damping unit 314. In FIG. 8, the shifting assembly 332 moves the magnetic unit 312a along the shifting axis 3324a towards the rotation axis 3141 of the conductive unit 314a. While the magnetic unit 312a is moving towards the rotation axis 3141, the electromagnetic induction force between the magnetic unit 312a and the conductive unit 314a is reduced due to the linear velocity of the conductive unit 314a relative to the magnetic unit 312a is reduced, and thus the damping force outputted by the damping module 310 to the window covering system 10 is reduced. On the contrary, in FIG. 9, the shifting assembly 332 moves the magnetic unit 312a along the shifting axis 3324a away from the rotation axis 3141 of the conductive unit 314a. While the magnetic unit 312a is moving towards the rotation axis 3141, the electromagnetic induction force between the magnetic unit 312a and the conductive unit 314a is increased due to the linear velocity of the conductive unit 314a relative to the magnetic unit 312a is increased, and thus the damping force outputted by the damping module 310 to the window covering system 10 is increased.

Figure 10:
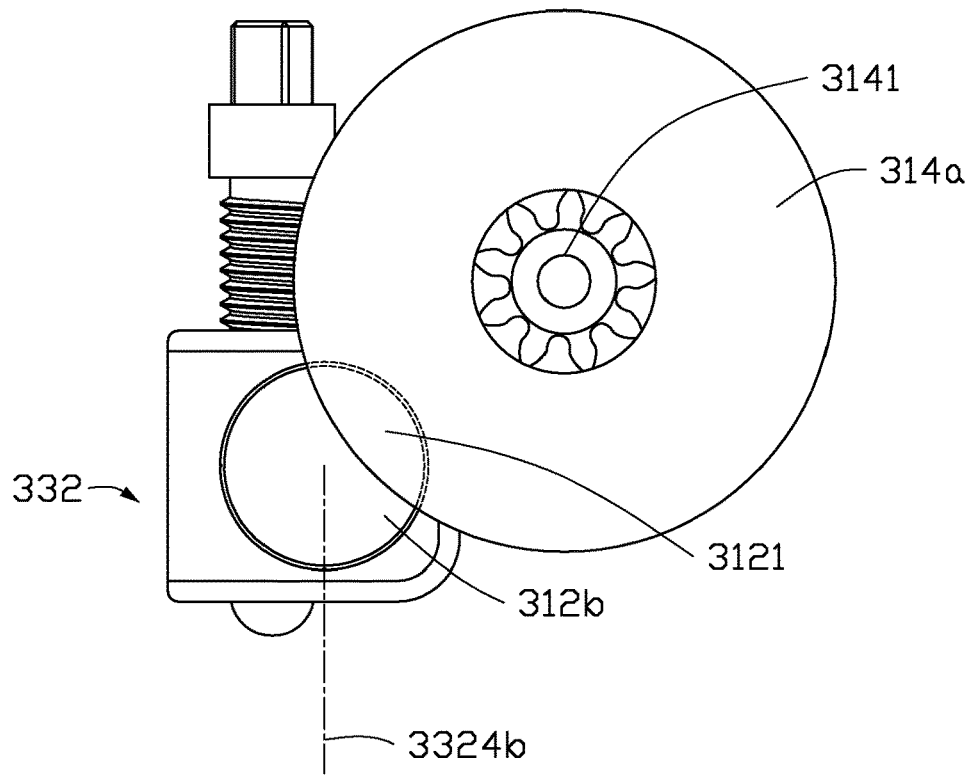
FIG. 10 and FIG. 11 are partial schematic illustrations of the damping adjustment device in different operation state.
Figure 11:
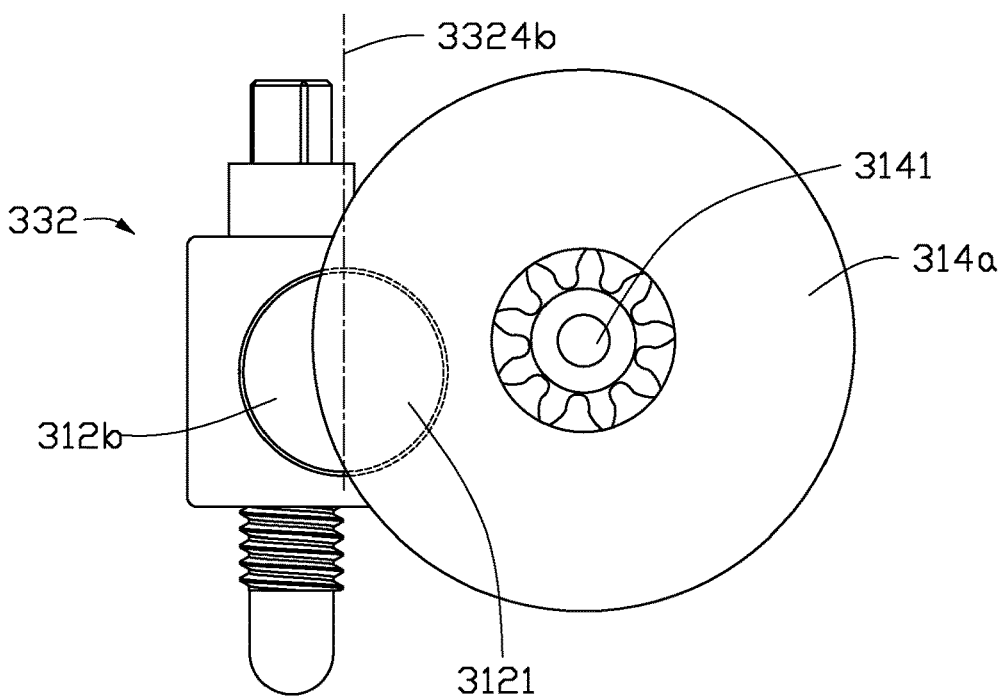

Referring to FIG. 7, FIG. 10 and FIG. 11, wherein FIG. 10 and FIG. 11 schematically shows another embodiment of the present disclosure. The first damping unit 312 and the second damping unit 314 have an overlapping area in between, wherein the interaction force is generated within the overlapping area between the first damping unit 312 and the second damping unit 314. When the second damping unit 314 rotates about the rotation axis 3141, the shifting assembly 332 alters the overlapping area between the first damping unit 312 and the second damping unit 314 for changing the interaction force between the first damping unit 312 and the second damping unit 314. The first damping unit 312 can be a magnetic unit 312b; the second damping unit 314 can be the conductive unit 314a. It should be noted that, the shape and size of the magnetic unit 312b and the conductive unit 314a are only illustrated as an example and not intended to limit the scope of the present disclosure. In FIG. 10, the shifting assembly 332 moves the magnetic unit 312b along the shifting axis 3324b. At the same time, the overlapping area 3121, where the electromagnetic induction force is generated, between the conductive unit 314a and the magnetic unit 312b is reduced. Thus, the electromagnetic induction force generated between the conductive unit 314a and the magnetic unit 312b is reduced. Therefore, the damping force outputted by the damping module 310 to the window covering system 10 is reduced. On the contrary, in FIG. 11, the shifting assembly 332 moves the magnetic unit 312b along the shifting axis 3324b. At the same time, the overlapping area 3121, where the electromagnetic induction force is generated, between the conductive unit 314a and the magnetic unit 312b is increased. Thus, the electromagnetic induction force generated between the conductive unit 314a and the magnetic unit 312b is increased. Therefore, the damping force outputted by the damping module 310 to the window covering system 10 is increased.

It should be noted that, in FIG. 8 to FIG. 11, magnetic force damping is only for illustrating the gradual damping effect provided by the damping adjustment device 300 according to one embodiment of the present disclosure and not intended to limit the implementation of the damping adjustment module 300. In other embodiments of the present disclosure, other types of damping can be employed by the damping adjustment device 300 with appropriate and reasonable modification, for example, frictional force damping, oil (fluid resistance) damping, and electrostatic force damping. Various types of damping modules can also be employed simultaneously in a single damping adjustment device to optimize the damping effect provided by the damping adjustment device for the window covering system.

Referring back to FIG. 6 and FIG. 7, the adjusting module 330 operates simultaneously with the first damping unit 312 and the second damping unit 314 of the damping module 310 via a connecting rod 334, wherein the connecting rod 334 comprises a bevel gear 3341, a flat gear 3343 and a rod body 3345. The bevel gear 3341 and the flat gear 3343 are fixed separately at two opposite ends of the rod body 3345.

The shifting assembly 332 comprises a bevel gear 3325 fixed to one end of the threaded rod 3321, wherein the bevel gear 3341 of the connecting rod 334 is coupled to the bevel gear 3325 of the shifting assembly 332 by toothed engagement. Therefore, the connecting rod 334 drives the threaded rod 3321 of the shifting assembly 332 to rotate when the connecting rod 334 rotates. At the same time, the nut 3323 and the first damping unit 312 are moved while the threaded rod 3321 is rotating. Thus, the relative position of the first damping unit 312 and the second damping unit 314 is altered. In one embodiment of the present disclosure, the rod body 3345 of the connecting rod 334 is substantially perpendicular to the threaded rod 3321 of the shifting assembly 332, but is not limited thereto.

The damping module 310 further comprises a flat gear 202 which is connected to the second damping unit 314 coaxially. The flat gear 3343 of the connecting rod 334 is engaged to the flat gear 202 of the damping module 310 for operating simultaneously with the flat gear 202. When the flat gear 202 rotates, not only the connecting rod 334 is driven to rotate by the flat gear 202, but also the second damping unit 314 is driven to rotate at the same time because of the coaxial connection between the second damping unit 314 and the flat gear 202. In one embodiment of the present disclosure, the connecting rod 334 is substantially parallel to the rotation axis 3141 of the second damping unit 314. It should be noted that, in one embodiment of the present disclosure, the driving device 200 of the window covering system 10 is connected to the damping adjustment device 300 via the flat gear 202 for simultaneous operation between the driving device 200 and the damping adjustment device 300, wherein the driving device 200 and the second damping unit 314 of the damping module 310 are positioned coaxially. In another embodiment of the present disclosure, the rotation axis of the driving device can be either substantially parallel or perpendicular to the rotation axis of the second damping unit, or the rotation axis of the driving device can be coaxially positioned relative to the connecting rod.

The window covering system 10 can further comprise an accelerator 370 connected between the driving device 200 and the damping module 310. Specifically, the accelerator 370 is connected between the second damping unit 314 of the damping module 310 and the flat gear 202. When the driving device 200 operates, the accelerator 370 is driven to operate by the driving device 200, and thus the speed of the relative motion between the first damping unit 312 and the second damping unit 314 is greater than the operational speed of the driving device 200. More specifically, when the accelerator 370 operates, the second damping unit 314 is driven by the accelerator 370 to rotate with acceleration for enhancing the interaction force generated between the first damping unit 312 and the second damping unit 314, and thus increasing the damping force outputted by the damping module 310 to the driving device 200. In one embodiment of the present disclosure, the accelerator 370 can be a planetary gear accelerator or any other equivalent accelerating device. It should be noted that, the accelerator 370 is not a necessary configuration to the window covering system 10 if the damping module 310 can output enough damping force to the window covering system 10 without the accelerator 370. In other words, whether to include the accelerator 370 in the window covering system 10 may depend on how much damping force is outputted, and therefore the accelerator 370 is not a necessary component of the window covering system 10 in any embodiment of the present disclosure.

Figure 12:
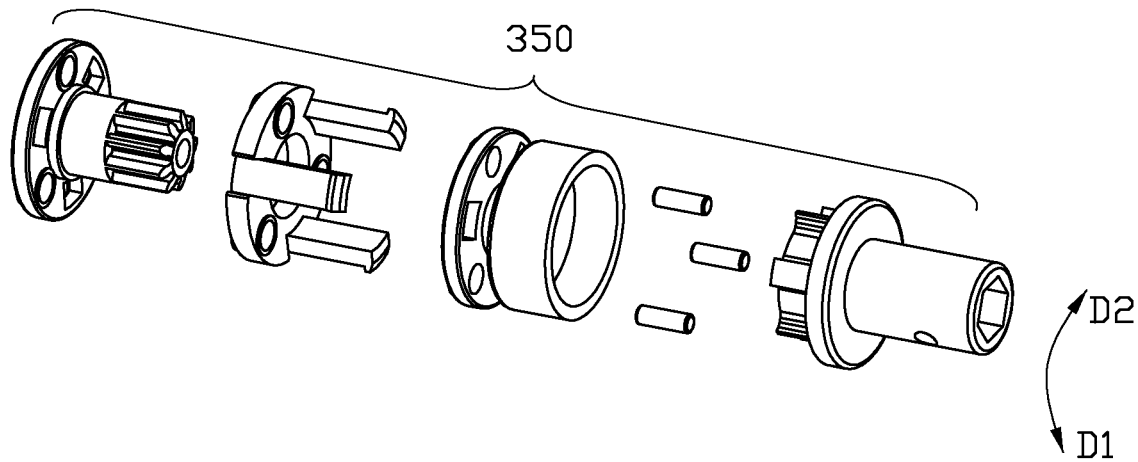
FIG. 12 is an exploded illustration of an unidirectional controller of the window covering system.

Referring to FIG. 6, FIG. 7 and FIG. 12, the window covering system 10 further comprising a unidirectional controller 350 which is connected between the driving device 200 and the damping module 310. In one embodiment of the present invention, the unidirectional controller 350 can be a roller clutch, spring clutch, track clutch, friction clutch, ratchet clutch or any other equivalent unidirectional clutches. When the covering material 13 expands, the driving device 200 drives the unidirectional controller 350 to rotate in a first direction D1, whereby the relative motion occurs between the first damping unit 312 and the second damping unit 314. Therefore, the damping module 310 outputs the damping force to the driving device 200. On the contrary, when the covering material 13 collects, the driving device 200 rotates in a second direction D2 which is opposite to the first direction D1, wherein the driving device 200 rotates freely in the second direction D2 independently of the damping module 310 due to the unidirectional controller 350. In other words, when the covering material 13 collects, the damping module 310 stops outputting the damping force to the driving device 200 due to the unidirectional controller 350 which restricts the simultaneous operation between the driving device 200 and the damping module 310 while the driving device 200 is rotating in the second direction D2. It should be noted that, even though the unidirectional controller 350 restricts the simultaneous operation between the driving device 200 and the damping module 310, the driving device 200 can still operate simultaneously with the adjusting module 330. Therefore, the rotation of the driving device 200 in the second direction D2 drives the adjusting module 330, and thus the shifting assembly 332 moves the first damping module 312 back to a position before the covering material 13 expands. However, the unidirectional controller 350 is only a standard configuration in any embodiment of the present disclosure and not a subject of the present disclosure. Therefore, the unidirectional controller 350 is not to be described any further.

Figure 13:
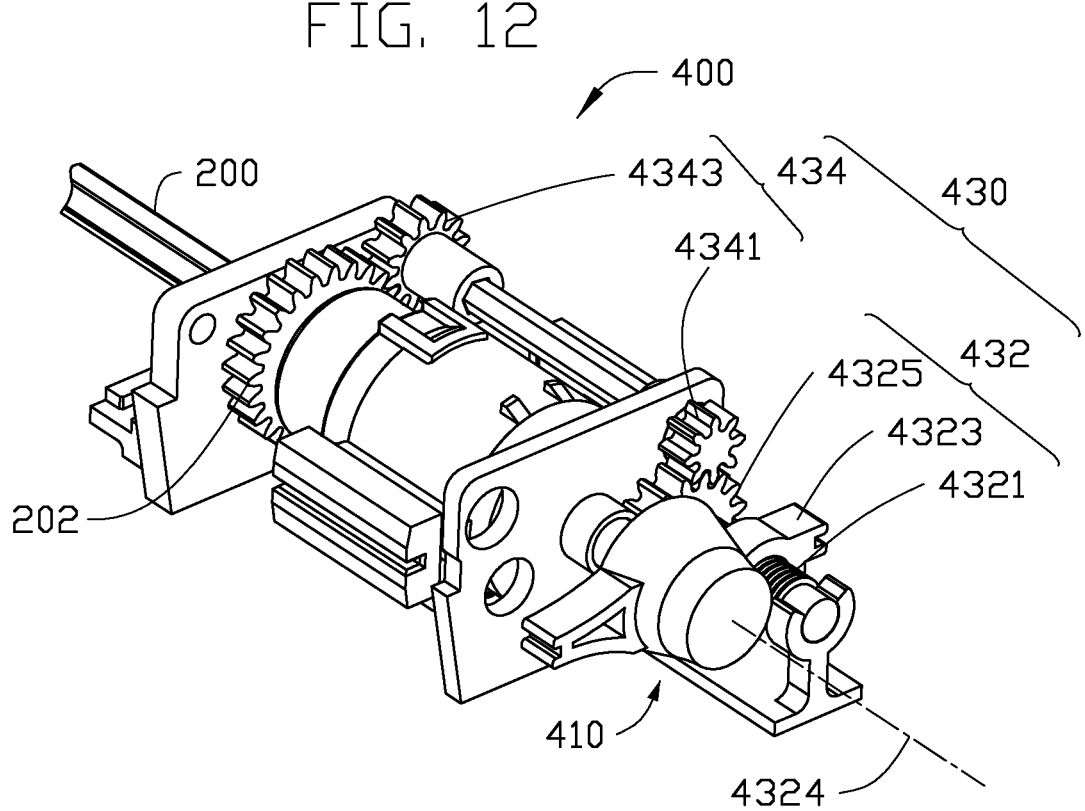
FIG. 13 is an schematic illustration of a damping adjustment device according to one embodiment of the present disclosure.
Figure 14:
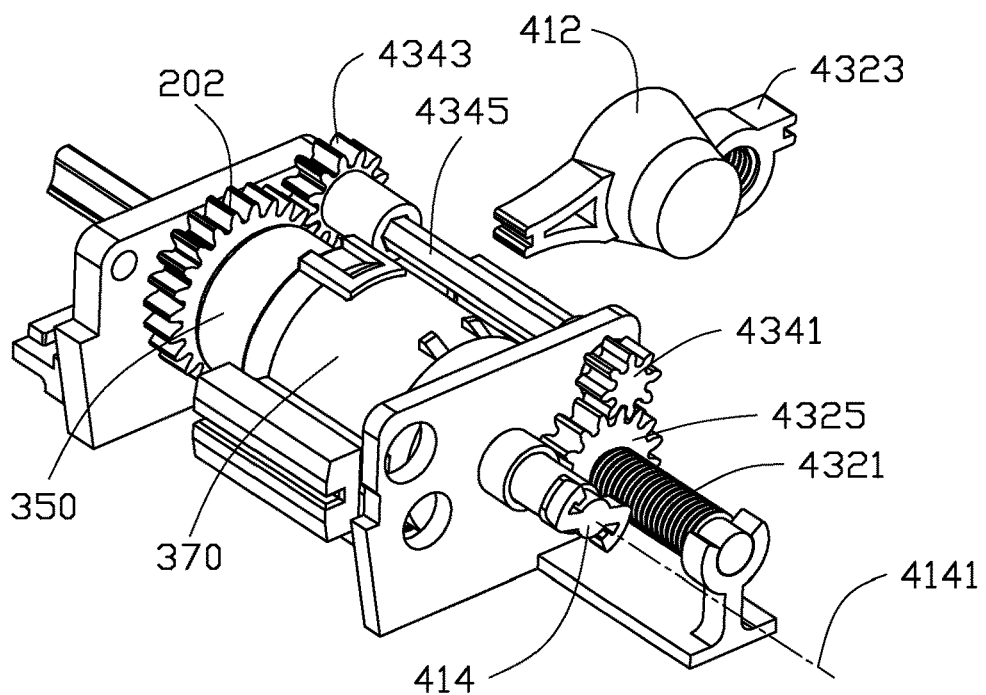
FIG. 14 is a partially exploded illustration of the damping adjustment device.
Figure 15:
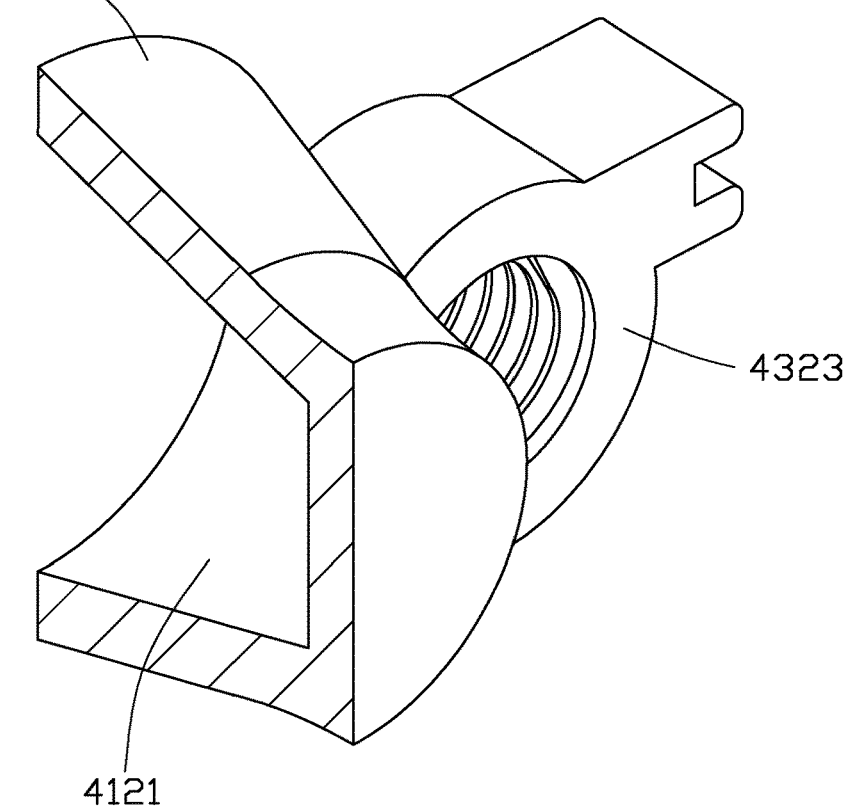
FIG. 15 is a sectional illustration of a second damping unit of the damping adjustment device.

FIG. 13 to FIG. 15 are schematic illustrations of damping adjustment device 400 according to one embodiment of the present disclosure. In FIG. 13 and FIG. 14, the damping adjustment device 400 comprises a damping module 410 and an adjusting module 430, wherein the damping module 410 comprises a first damping unit 412 and a second damping unit 414, and the adjusting module 430 is connected to the first damping unit 412 and the second damping unit 414 of the damping module 410 for simultaneously operating with the first damping unit 412 and the second damping unit 414.

The adjusting module 430 comprises a shifting assembly 432 which comprises a threaded rod 4321 and a nut 4323 coupled to the threaded rod 4321 by threaded engagement. When the threaded rod 4321 rotates, the threaded rod 4321 drives the nut 4323 to move along a rotation axis of the threaded rod 4321 in an axial direction of the rotation axis, and the first damping unit 412 connected to the nut 4323 moves simultaneously with the nut 4323 along a shifting axis 4324, wherein the shifting axis 4324 is substantially parallel to the rotation axis of the threaded rod 4321. In one embodiment of the present disclosure, the first damping unit 412 and the nut 4323 are either integrally formed in one piece or the first damping unit 412 can be fixed to the nut 4323. With respect to the window covering system 10, the driving device 200 comprises a driving axis, wherein the driving axis is substantially parallel to the shifting axis 4324 of the shifting assembly 432.

The second damping unit 414 of the damping module 410 comprises a rotation axis 4141 which the second damping unit 414 rotates about. The rotation axis 4141 of the second damping unit 414 is coaxially positioned with the shifting axis 4324 of the shifting assembly 432. When the shifting assembly 432 operates simultaneously with the second damping unit 414, the first damping unit 412 is moved relative to the second damping unit 414 by the shifting assembly 432, whereby the interaction force between the first damping unit 412 and the second damping unit 414 is changed. To be more specific, the second damping unit 414, the shifting assembly 432 and the driving device 200 are connected to each other, and thus the second damping unit 414 and the shifting assembly 432 operate simultaneously with the driving device 200. Therefore, the shifting assembly 332 moves the first damping unit 412 relative to the second damping unit 414 while the driving device 200 is driving the second damping unit 414 to rotate, whereby the interaction force between the first damping unit 412 and the second damping unit 414 is changed. Furthermore, the shifting assembly 432 alters the interaction force between the first damping unit 412 and the second damping unit 414 by moving the first damping unit 412 relative to the second damping unit 414 along the rotation axis 4141 of the second damping unit 414 in an axial direction of the rotation axis 4141.

Referring to FIG. 13 to FIG. 15, the first damping unit 412 is exemplified by a hollow sleeve with an inner wall 4121 which is partially frustoconical; the second damping unit 414 is exemplified by an elastic component which can be substantially "S" shape, "Z" shape or any other equivalent elastic components. The elastic component comprises the rotation axis 4141, and the elastic component can rotate about the rotation axis 4141. A frictional force is generated between the elastic component of the second damping unit 414 and the inner wall 4121 of the first damping unit 412 when the elastic component is rotating and contacting the inner wall 4121. It should be noted that, the shape and size of the first damping unit 412 and the second damping unit 414 are only illustrated as an example and not intended to limit the scope of the present disclosure. In another embodiment of the present disclosure, the first damping unit can be the elastic component, and the second damping unit can be the hollow sleeve.

In FIG. 13, when the shifting assembly 432 drives the first damping unit 412 to move along the shifting axis 4324, an inner diameter of the inner wall 4121 of the first damping unit 412 reduces while the first damping unit 412 is moving closer to the second damping unit 414, whereby the "S" shape second damping unit 414 is compressed by the first damping unit 412 due to the reduction in the inner diameter. Therefore, the frictional force between the first damping unit 412 and the second damping unit 414 is enhanced, and thus the damping force outputted by the damping module 410 to the window covering system 10 is increased. On the contrary, the inner diameter of the inner wall 4121 of the first damping unit 412 increases while the first damping unit 412 is moving away from the second damping unit 414, whereby the "S" shape second damping unit 414 is relaxed by the first damping unit 412 due to the increase in the inner diameter. Therefore, the frictional force between the first damping unit 412 and the second damping unit 414 is reduced, and thus the damping force outputted by the damping module 410 to the window covering system 10 is reduced. In one embodiment of the present disclosure, when the adjusting module 430 alters the relative position of the first damping unit 412 and the second damping unit 414, the inner wall 4121 of the first damping unit 412 varies a radial length of the second damping unit 414 in order to change the frictional force.

However, in another embodiment of the present disclosure, the inner diameter of the inner wall of the first damping unit reduces while the first damping unit is moving away from the second damping unit, whereby the "S" shape second damping unit is compressed by the first damping unit due to the reduction in the inner diameter. Therefore, the frictional force between the first damping unit and the second damping unit is enhanced, and thus the damping force outputted by the damping module to the window covering system is increased. On the contrary, the inner diameter of the inner wall of the first damping unit increases while the first damping unit is moving closer to the second damping unit, whereby the "S" shape second damping unit is relaxed by the first damping unit due to the increase in the inner diameter. Therefore, the frictional force between the first damping unit and the second damping unit is reduced, and thus the damping force outputted by the damping module to the window covering system is reduced. In addition, in other embodiments of the present disclosure, if the damping force is required to be increased and decreased incrementally while the covering material is expanding, the inner diameter of the inner wall of the first damping unit can be varied according to the damping force required during the expansion of the covering material, for example, the inner wall of the first damping unit can be defined with a "wave" shape.

It should be noted that, in FIG. 13 to FIG. 15, frictional force damping is only for illustrating the gradual damping effect provided by the damping adjustment device 400 according to one embodiment of the present disclosure and not intended to limit the implementation of the damping adjustment module 400. In other embodiments of the present disclosure, other types of damping can be employed by the damping adjustment device 400 with appropriate and reasonable modification, for example, magnetic force damping, oil (fluid resistance) damping, and electrostatic force damping. Various types of damping modules can also be employed simultaneously in a single damping adjustment device to optimize the damping effect provided by the damping adjustment device for the window covering system.

Referring back to FIG. 13 and FIG. 14, the adjusting module 430 operates simultaneously with the damping unit 412 and the damping unit 414 of the damping module 410 via a connecting rod 434, wherein the connecting rod 434 comprises a flat gear 4341, a flat gear 4343 and a rod body 4345. The flat gear 4341 and the flat gear 4343 are fixed separately at two opposite ends of the rod body 4345.

The shifting assembly 432 comprises a flat gear 4325 fixed to one end of the threaded rod 4321. Unlike the bevel gears used in the previous embodiment, the flat gear 4341 of the connecting rod 434 is coupled to the flat gear 4325 of the shifting assembly 432 by toothed engagement. Therefore, the connecting rod 434 drives the threaded rod 4321 of the shifting assembly 432 to rotate when the connecting rod 434 rotates. At the same time, the nut 4323 and the damping unit 412 are moved while the threaded rod 4321 is rotating. In one embodiment of the present disclosure, the rod body 4345 of the connecting rod 434 is substantially parallel to the threaded rod 4321 of the shifting assembly 432, but is not limited thereto.

The damping module 410 further comprises a flat gear 202 which is connected to the second damping unit 414 coaxially. The flat gear 4343 of the connecting rod 434 is engaged to the flat gear 202 of the damping module 410 for operating simultaneously with the flat gear 202. When the flat gear 202 rotates, not only the connecting rod 434 is driven to rotate by the flat gear 202, but also the second damping unit 414 is driven to rotate at the same time because of the coaxial connection between the second damping unit 414 and the flat gear 202. In one embodiment of the present disclosure, the connecting rod 434 is substantially parallel to the rotation axis 4141 of the second damping unit 414. It should be noted that, in one embodiment of the present disclosure, the driving device 200 of the window covering system 10 is connected to the damping adjustment device 400 via the flat gear 202 for simultaneous operation between the driving device 200 and the damping adjustment device 400, wherein the driving device 200 and the second damping unit 414 of the damping module 410 are positioned coaxially.

In FIG. 3 and FIG. 14, the window covering system 10 can further comprise an accelerator 370 connected between the driving device 200 and the damping module 410, and the accelerator 370 is configured to simultaneously operate with the driving device 200 and the damping module 410. Specifically, the accelerator 370 is connected between the second damping unit 414 of the damping module 410 and the flat gear 202. Since the accelerator 370 is not a necessary component of the window covering system 10 in any embodiment of the present disclosure, and the installation condition, object and effect of the accelerator 370 are described before as well. Therefore, detail of the accelerator 370 will not be described herein.

Referring to FIG. 3 and FIG. 14, the window covering system 10 further comprising a unidirectional controller 350 which is connected between the driving device 200 and the damping module 410. However, the unidirectional controller 350 is only a standard configuration in any embodiment of the present disclosure and not a subject of the present disclosure. In addition, the installation condition, object and effect of the unidirectional controller 350 are described before as well. Therefore, detail of the unidirectional controller 350 will not be described herein.

FIG. 16 to FIG. 26 are schematic illustrations of a damping adjustment device 500 according to one embodiment of the present disclosure. In FIG. 16 to FIG. 21, the damping adjustment device 500 comprises a damping module 510a and an adjusting module 530, wherein the damping module 510a comprises a first damping unit 512a and a second damping unit 514a, and the adjusting module 530 is only connected to the first damping unit 512a of the damping module 510a for simultaneously operating with the first damping unit 512a.

Figure 16:
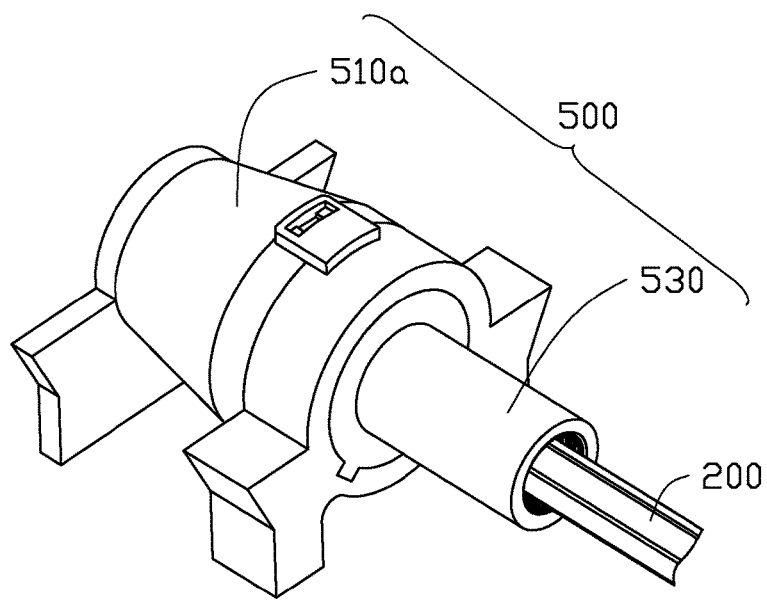
FIG. 16 is an schematic illustration of a damping adjustment device according to one embodiment of the present disclosure.
Figure 17:
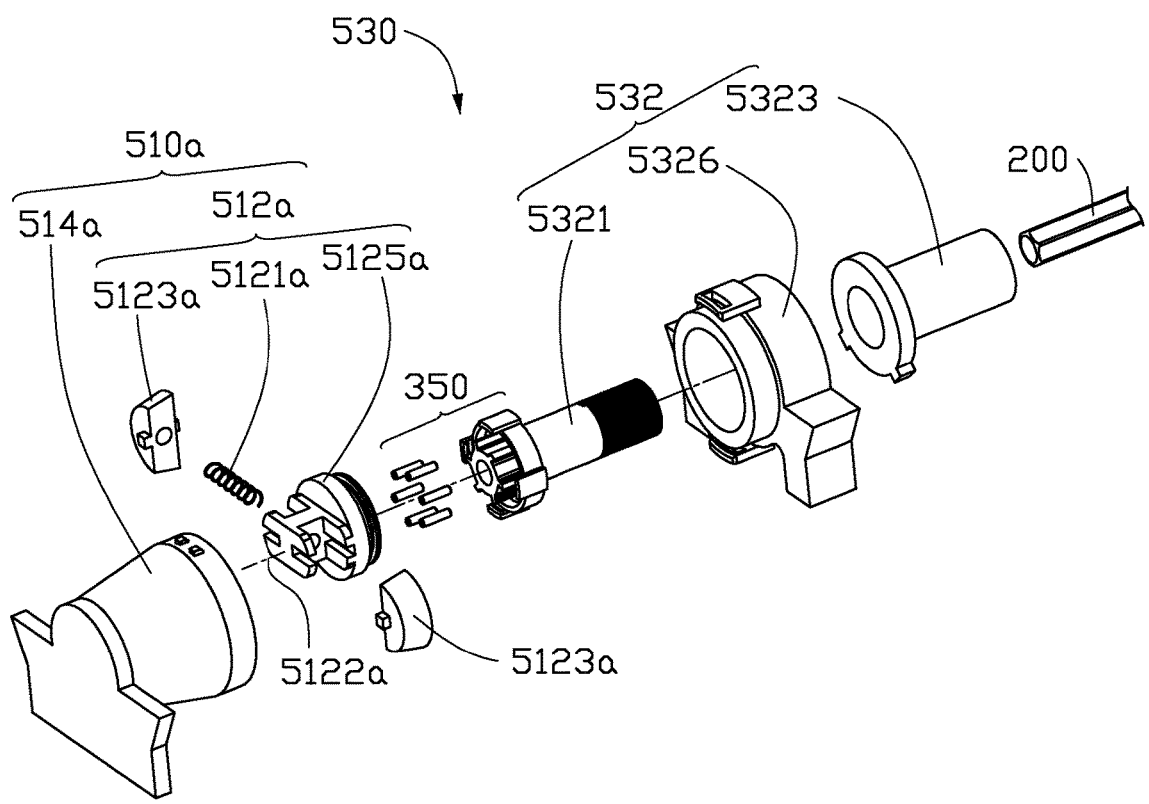
FIG. 17 is a partially exploded illustration of the damping adjustment device.
Figure 18:
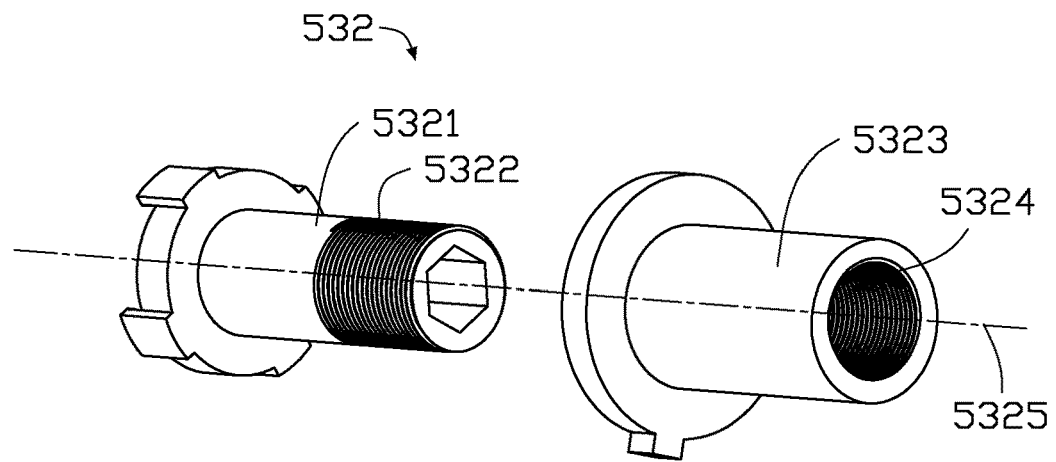
FIG. 18 is a schematic illustration of a shifting assembly of the damping adjustment device.

Referring to FIG. 16, FIG. 17 and FIG. 18, the adjusting module 530 comprises a shifting assembly 532 which can drive the first damping unit 512a to rotate about the shifting axis 5325 simultaneously. Specifically, the shifting assembly 532 comprises a threaded rod 5321, a threaded bush 5323 and a base 5326, wherein one end of the threaded rod 5321 is sleeved over by the threaded bush 5323 which is fixed on the base 5326. An external thread 5322 of the threaded rod 5321 is coupled to an internal thread 5324 of the threaded bush 5323 by threaded engagement. Since the threaded bush 5323 is fixed to the base 5326, the threaded rod 5321 moves along the shifting axis 5325 in an axial direction of the shifting axis 5325 while the threaded rod 5321 is rotating. On the other hand, the first damping unit 512a of the damping module 510a is fixed to the other end of the threaded rod 5321, and thus the first damping unit 512a rotates together with the threaded rod 5321. In one embodiment of the present disclosure, the shifting axis 5325, a rotation axis of the threaded rod 5321 and a rotation axis 5122a of the first damping unit 512a are positioned coaxially. In another embodiment of the present disclosure, the shifting axis 5325, the rotation axis of the threaded rod 5321 and the rotation axis 5122a of the first damping unit 512a can be parallel, coaxial or a combination of both. With respect to the window covering system 10, the driving device 200 further comprises a driving axis positioned coaxially with the shifting axis 5325 of the shifting assembly 532. In addition, when the driving device 200 operates, the shifting assembly 532 drives the first damping unit 512a to rotate about the shifting axis 5325.

The second damping unit 514a of the damping module 510a is sleeved over the first damping unit 512a which is positioned between the shifting assembly 532 and the second damping unit 514a. In addition, the shifting assembly 532 is positioned between the second damping unit 514a and the driving device 200. When the shifting assembly 532 operates, the first damping unit 512a is driven by the shifting assembly 532 to move relative to the second damping unit 514a in order to change the interaction force between the first damping unit 512a and the second damping unit 514a.

Specifically, when the threaded rod 5321 of the shifting assembly 532 rotates, the threaded rod 5321 and the first damping unit 512a move along the shifting axis 5325 in the axial direction of the shifting axis 5325, and thus the first damping unit 512a moves relative to the second damping unit 514a. Therefore, the interaction force between the first damping unit 512a and the second damping unit 514a is changed.

Figure 19:
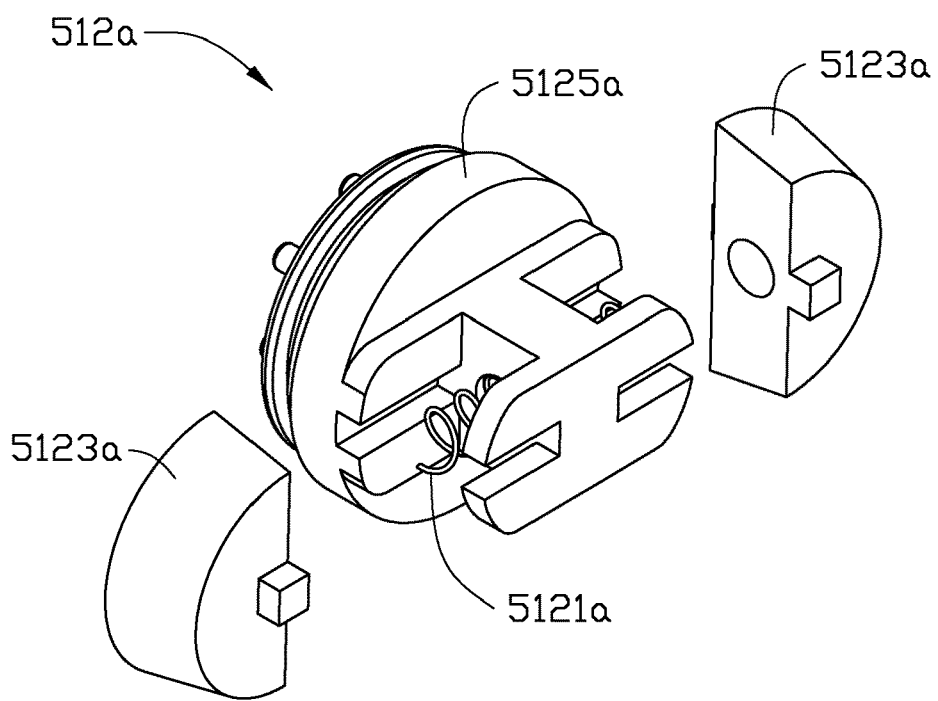
FIG. 19 and FIG. 20 are exploded illustrations of a first damping unit of the damping adjustment device.
Figure 20:
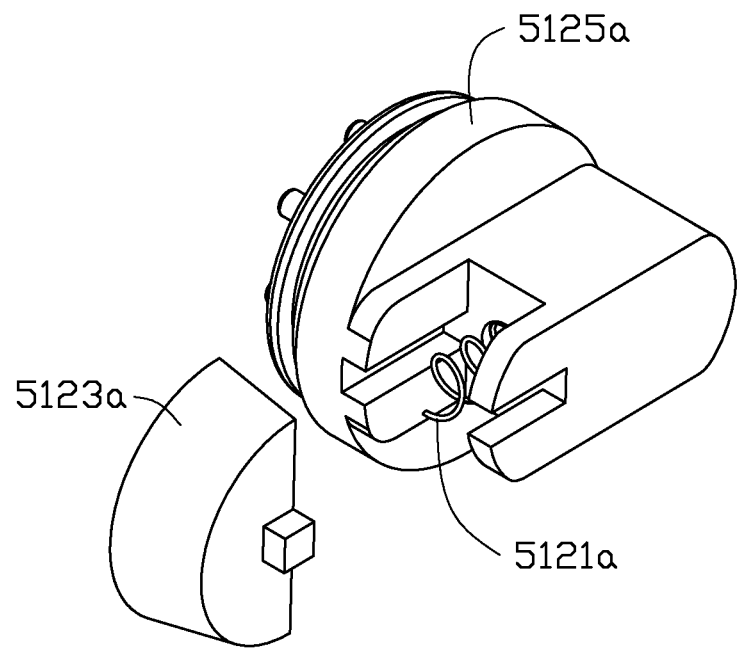
Figure 21:
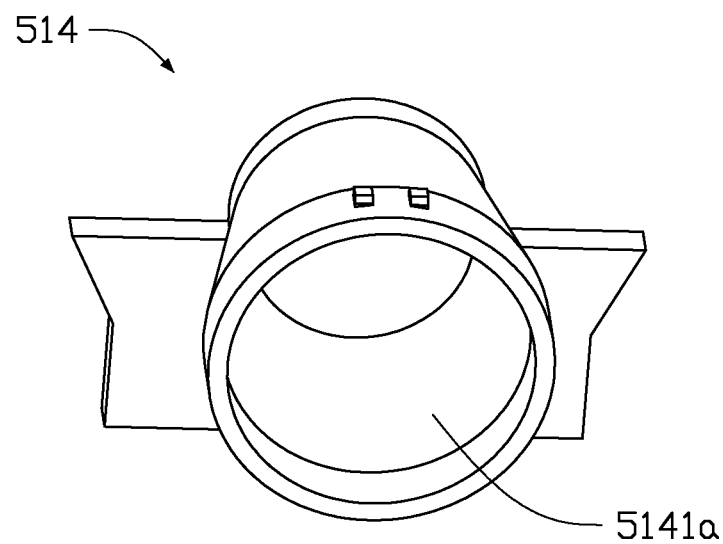
FIG. 21 is a schematic illustration of a second damping unit of the damping adjustment device.
Figure 22:
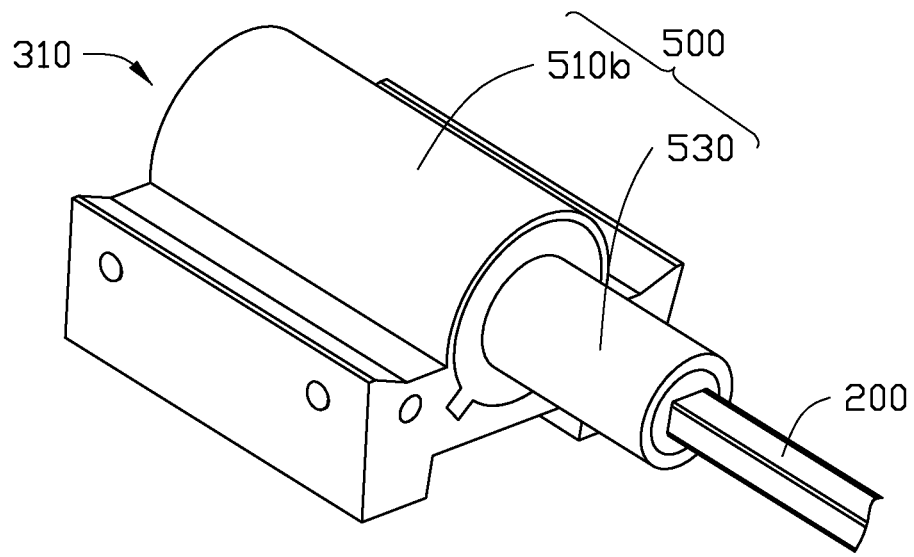
FIG. 22 is another schematic illustration of the damping adjustment device according to one embodiment of the present disclosure.

Referring to FIG. 19, FIG. 20 and FIG. 21, the first damping unit 512a is exemplified by an elastic component which comprises an elastic unit 5121a, a friction block 5123a, and a base 5125a, wherein the elastic unit 5121a and the friction block 5123a are connected to each other, and the elastic unit 5121a and the friction block 5123a are both mounted on the base 5125a; the second damping unit 514a is exemplified by a hollow sleeve with an inner wall 5141a which is partially frustoconical. The elastic component comprises the rotation axis 5122a and the elastic component can rotate about the rotation axis 5122a. A frictional force is generated between the elastic component of the first damping unit 512a and the inner wall 5141a of the second damping unit 514a when the elastic component is rotating and contacting the inner wall 5141a. In FIG. 19, the elastic unit 5121a is mounted to the base 5125a by passing through the base 5125a, and both friction blocks 5123a are fixed at opposite ends of the elastic unit 5121a such that the friction blocks 5123a are positioned symmetrically with regard to the elastic unit 5121a. In FIG. 20, one end of the elastic unit 5121a is fixed to the base 5125a, and the other end of the elastic unit 5121a is connected to the friction block 5123a such that the friction block 5123a is positioned unsymmetrically with regard to the elastic unit 5121a. It should be noted that, the shape and size of the elastic unit 5121a, the friction block 5123a, the base 5125a and the inner wall 5141a of the hollow sleeve are only illustrated as an example and not intended to limit the scope of the present disclosure. In another embodiment of the present disclosure, the first damping unit can be the hollow sleeve, and the second damping unit can be the elastic component.

In FIG. 17, when the shifting assembly 532 drives the first damping unit 512a to move along the shifting axis 5325, an inner diameter of the inner wall 5141a of the second damping unit 514a reduces while the first damping unit 512a is moving closer to the second damping unit 514a, whereby the friction blocks 5123a of the first damping unit 512a are pushed towards each other by the second damping unit 514a such that a radial length of the elastic component relative to the rotation axis 5122a is reduced due to the reduction in the inner diameter. Therefore, the frictional force between the first damping unit 512a and the second damping unit 514a is enhanced, and thus the damping force outputted by the damping module 510a to the window covering system 10 is increased. On the contrary, the inner diameter of the inner wall 5141a of the second damping unit 514a increases while the first damping unit 512a is moving away from the second damping unit 514a, whereby the friction blocks 5123a of the first damping unit 512a are relaxed to part from each other by the second damping unit 514a such that a radial length of the elastic component relative to the rotation axis 5122a is increased due to the increase in the inner diameter. Therefore, the frictional force between the first damping unit 512a and the second damping unit 514a is reduced, and thus the damping force outputted by the damping module 510a to the window covering system 10 is reduced.

However, in another embodiment of the present disclosure, the inner diameter of the inner wall of the second damping unit reduces while the first damping unit is moving away from the second damping unit, whereby the friction blocks of the first damping unit are pushed towards each other by the second damping unit such that a radial length of the elastic component relative to the rotation axis is reduced due to the reduction in the inner diameter. Therefore, the frictional force between the first damping unit and the second damping unit is enhanced, and thus the damping force outputted by the damping module to the window covering system is increased. On the contrary, the inner diameter of the inner wall of the second damping unit increases while the first damping unit is moving closer to the second damping unit, whereby the friction blocks of the first damping unit are relaxed to part from each other by the second damping unit such that a radial length of the elastic component relative to the rotation axis is increased due to the increase in the inner diameter. Therefore, the frictional force between the first damping unit and the second damping unit is reduced, and thus the damping force outputted by the damping module to the window covering system is reduced. In addition, in other embodiments of the present disclosure, if the damping force is required to be increased and decreased incrementally while the covering material is expanding, the inner diameter of the inner wall of the second damping unit can be varied according to the damping force required during the expansion of the covering material, for example, the inner wall of the second damping unit can be defined with a "wave" shape.

FIG. 22 to FIG. 26 are schematic illustrations of the damping adjustment device 500 according to another embodiment of the present disclosure. The damping adjustment device 500 comprises a damping module 510b and an adjusting module 530, wherein the damping module 510b comprises a first damping unit 512b and a second damping unit 514b, and the adjusting module 530 is only connected to the first damping unit 512b of the damping module 510b for simultaneously operating with the first damping unit 512b. The adjusting module 530 comprises the shifting assembly 532. However, the structure and the connection between components of the shifting assembly 532 are described in detail as foregoing in FIGS. 16 to 18, and thus will not be repeated herein.

Figure 23:
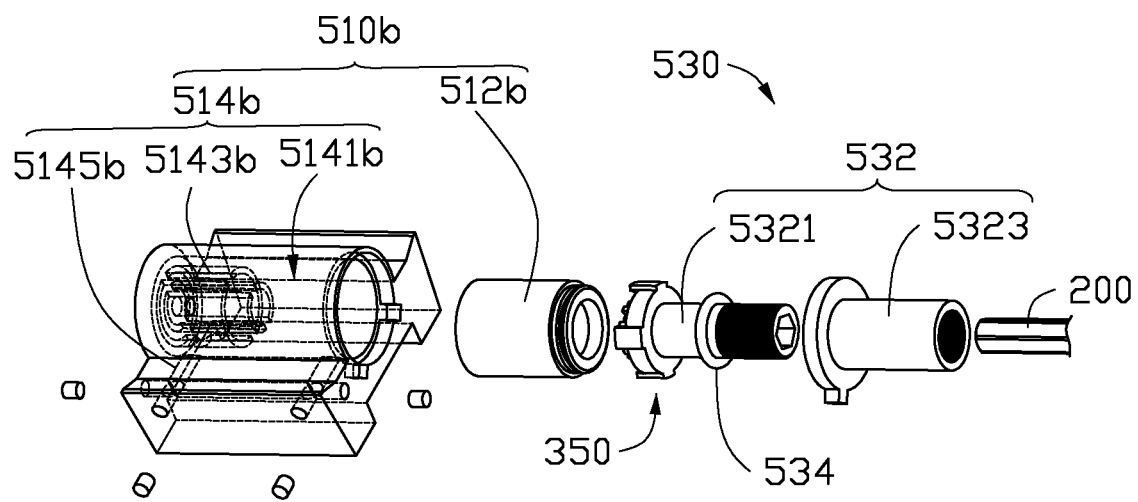
FIG. 23 is another schematic illustration of the damping adjustment device according to one embodiment of the present disclosure.
Figure 24:
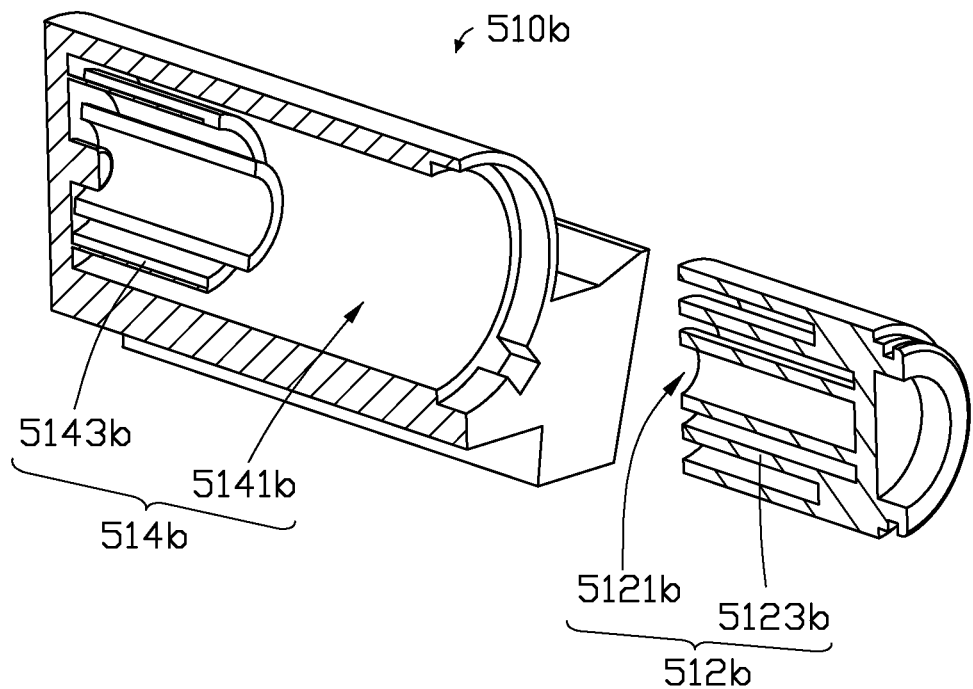
FIG. 24 is an sectional illustration of a damping module of the damping adjustment device.

The second damping unit 514b of the damping module 510b is sleeved over the first damping unit 512b which is positioned between the shifting assembly 532 and the second damping unit 514b. When the shifting assembly 532 operates, the first damping unit 512b is driven by the shifting assembly 532 to move relative to the second damping unit 514b in order to change the interaction force between the first damping unit 512b and the second damping unit 514b. Referring to FIG. 18 and FIG. 23, when the threaded rod 5321 of the shifting assembly 532 rotates, the threaded rod 5321 and the first damping unit 512b move along the shifting axis 5325 in the axial direction of the shifting axis 5325, and thus the first damping unit 512b moves relative to the second damping unit 514b. Therefore, the interaction force between the first damping unit 512b and the second damping unit 514b is changed.

Referring to FIG. 23 to FIG. 26, the first damping unit 512b has a cylindrical appearance, wherein the first damping unit 512b comprises at least one concentric structure 5123b and a space 5121b which is partially divided by the at least one concentric structure 5123b; the second damping unit 514b has an internal structure similar to the first damping unit 512b, wherein the second damping unit 514b comprises at least one concentric structure 5143b and a space 5141b which is partially divided by the at least one concentric structure 5143b. It should be noted that, an inner diameter of the space 5141b of the second damping unit 514b is larger than an outer diameter of the first damping unit 512b, and thus the first damping unit 512b can be contained within the space 5141b of the second damping unit 514b where the first damping unit 512b can move within. In one embodiment of the present disclosure, the first damping unit 512b is completely or partially contained within the space 5141b of the second damping unit 514b. In another embodiment of the present disclosure, the first damping unit and the second damping unit can comprise other stirring structure within, wherein the stirring structure can stir a fluid to generate fluid resistance, for example, a paddle or a blade.

Figure 25:
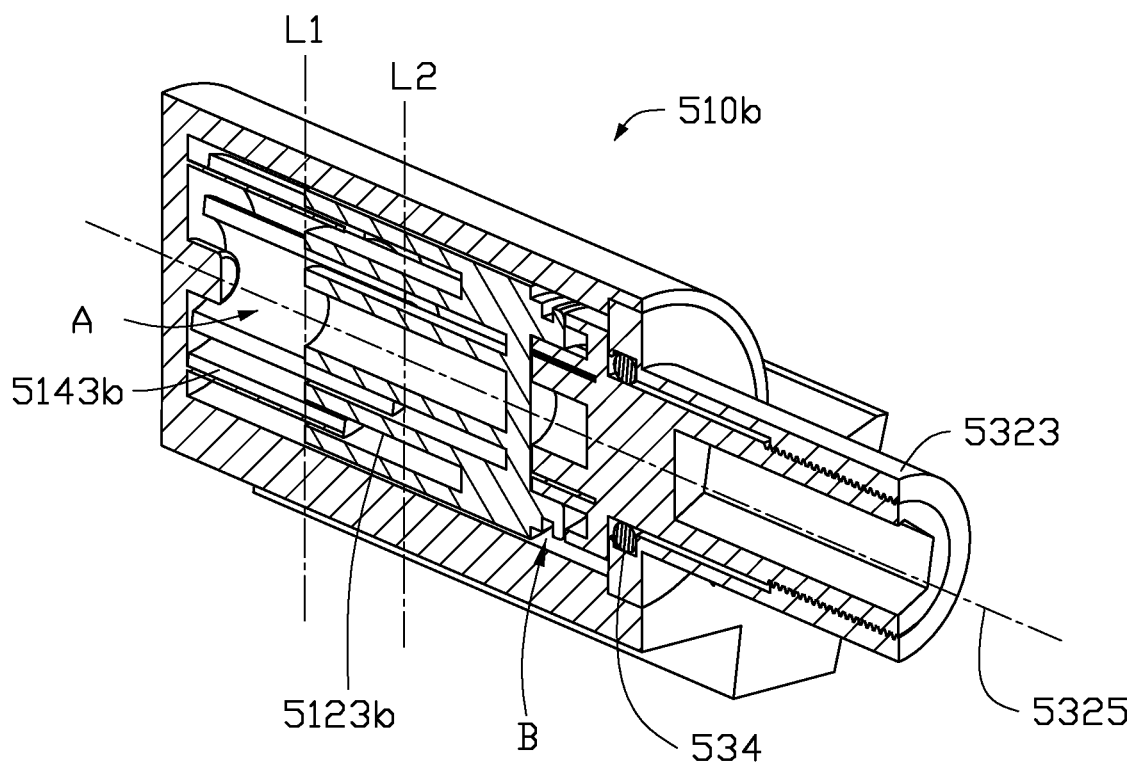
FIG. 25 and FIG. 26 are sectional illustrations of the damping adjustment device in different operation state.
Figure 26:
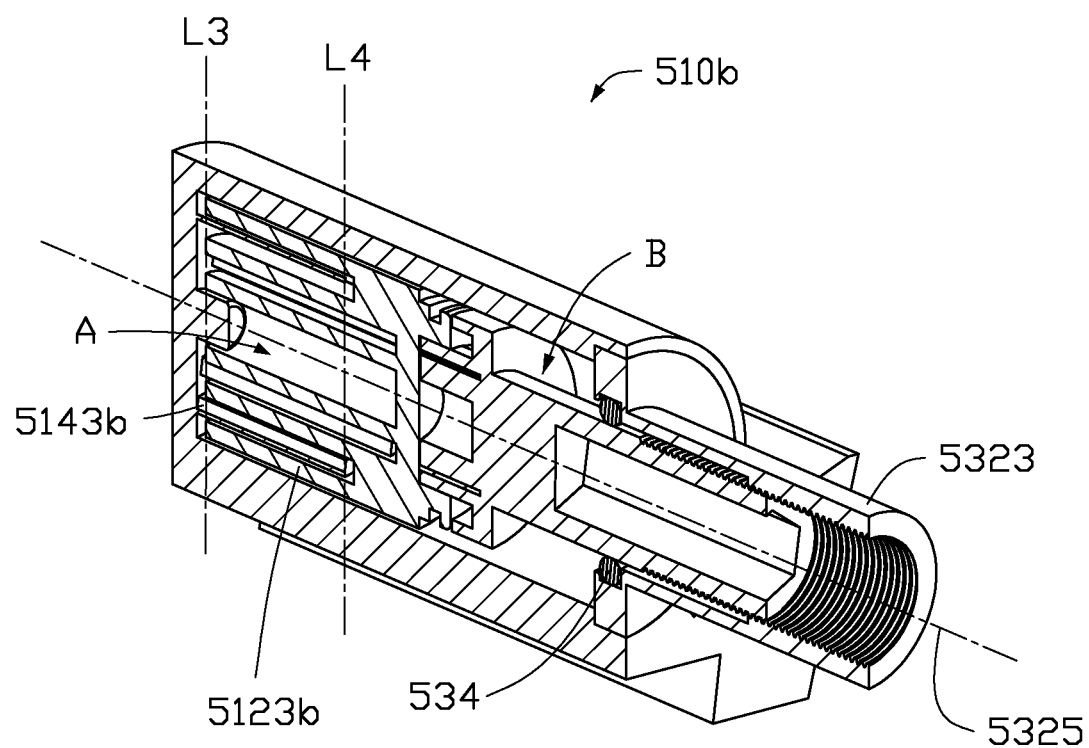

The damping adjustment device 500 further comprises a fluid between the first damping unit 512b and the second damping unit 514b, and the interaction force generated between the first damping unit 512b and the second damping unit 514b is a fluid resistance. In one embodiment of the present disclosure, the fluid can comprise liquid or gas, particularly substance with high viscosity such as damping oil. In FIG. 25 and FIG. 26, the space 5141b of the second damping unit 514b is filled with the fluid. Specifically, the fluid fills an airtight space formed between the second damping unit 514b and the threaded brush 5323. The adjusting module 530 further comprises a sealing ring 534 for preventing the fluid to escape from the threaded brush 5323, wherein the sealing ring 534 is sleeved over the threaded rod 5321 and positioned between the threaded rod 5321 and the threaded brush 5323 for enhancing sealing ability of adjusting module 530.

In FIG. 25 and FIG. 26, an overlapping area is defined between the first damping unit 512b and the second damping unit 514b, and the fluid resistance is generated by the first damping unit 512b and the second damping unit 514b within the overlapping area. When the relative motion occurs between the first damping unit 512b and the second damping unit 514b, the fluid resistance is generated between the first damping unit 512b, the second damping unit 514b and the fluid. At the same time, the adjusting module 530 alters the relative position of the first damping unit 512b and the second damping unit 514b, and thus the overlapping area between the first damping unit 512b and the second damping unit 514b is altered. Since the fluid resistance is generated due to the overlapping area, the fluid resistance is adjusted as the overlapping area is altered. In another word, when the threaded rod 5321 of the shifting assembly 532 rotates, the threaded rod 5321 and the first damping unit 512b move along the shifting axis 5325 in an axial direction of the shifting axis 5325, whereby the overlapping area which causes generation of the fluid resistance between the first damping unit 512b and the second damping unit 514b is altered. Referring to FIG. 25, when the first damping unit 512b moves along the shifting axis 5325 towards the threaded brush 5323, the overlapping area (as shown between dotted line L1 and L2) between the concentric structure 5123b of the first damping unit 512b and the concentric structure 5143b of the second damping unit 514b and with respect to the axial direction of the shifting axis 5325 is reduced, and thus the fluid resistance is reduced such that the damping force outputted by the damping module 510b is reduced. On the contrary, in FIG. 26, when the first damping unit 512b moves along the shifting axis 5325 away from the threaded brush 5323, the overlapping area (as shown between dotted line L3 and L4) between the concentric structure 5123b of the first damping unit 512b and the concentric structure 5143b of the second damping unit 514b and with respect to the axial direction of the shifting axis 5325 is increased, and thus the fluid resistance is increased such that the damping force outputted by the damping module 510b is increased.

It should be noted that, referring to FIG. 23, FIG. 25 and FIG. 26, when the first damping unit 512b is moving within the second damping unit 514b, the fluid flows between a space A and a space B via a channel 5145b of the second damping unit 514b, and thus the space 5141b of the second damping unit 514b can be filled with the fluid at all time. In another embodiment of the present disclosure, the second damping unit does not have the channel, but a ventilation hole is defined at top of the space of the second damping unit for air to flow in and out. At the same time, a contacting area between the fluid and the first damping unit changes with respect to the expansion of the covering material, and therefore changes the damping force outputted by the damping module to the driving device. This is another embodiment of the present disclosure in which the gradual damping effect is realized.

It should be noted that, in FIG. 16 to FIG. 26, frictional force damping and fluid resistance damping are only for illustrating the gradual damping effect provided by the damping adjustment device 500 according to one embodiment of the present disclosure and not intended to limit the implementation of the damping adjustment module 500. In other embodiments of the present disclosure, other types of damping can be employed by the damping adjustment device 500 with appropriate and reasonable modification, for example, magnetic force damping, and electrostatic force damping. Various types of damping modules can also be employed simultaneously in a single damping adjustment device to optimize the damping effect provided by the damping adjustment device for the window covering system.

Referring to FIG. 3, FIG. 17 and FIG. 23, the window covering system 10 can further comprising a unidirectional controller 350 which is connected between the driving device 200 and the damping module 510a or the damping module 510b. However, the unidirectional controller 350 is only a standard configuration in any embodiment of the present disclosure and not a subject of the present disclosure. In addition, the installation condition, object and effect of the unidirectional controller 350 are described before as well. Therefore, detail of the unidirectional controller 350 will not be described herein.

In other embodiment of the present disclosure, the window covering system 10 can further comprise an accelerator (not shown) connected between the driving device 200 and the damping module 510a or the damping module 510b. Since the accelerator is not a necessary component of the window covering system 10 in any embodiment of the present disclosure, and the installation condition, object and effect of the accelerator are described before as well. Therefore, detail of the accelerator will not be described herein.

Previous descriptions are only embodiments of the present disclosure and are not intended to limit the scope of the present disclosure. Many variations and modifications according to the claims and specification of the disclosure are still within the scope of the claimed disclosure. In addition, each of the embodiments and claims does not have to achieve all the advantages or characteristics disclosed. Moreover, the abstract and the title only serve to facilitate searching patent documents and are not intended in any way to limit the scope of the claimed disclosure.

It will be apparent to those skilled in the art that the present disclosure is not limited to the details of the foregoing exemplary embodiments, and that the disclosure may be realized in any other specific forms without departing from the spirit or essential characteristics of the present disclosure. Therefore, all the aforementioned embodiments should only be considered as illustrative and not restrictive in all aspects. The scope of the disclosure is defined by the claims rather than by the foregoing descriptions, and therefore the scope of the disclosure is intended to cover any changes within equivalent meaning and range thereof. Any numbering in the claims shall not be construed as limiting the claims. Furthermore, "comprise" does not exclude other elements or steps, and the singular does not exclude a plurality. The plurality of units or means recited in the system claims may also be realized by software or hardware from a unit or device.

What is claimed is:

1. A damping adjustment device for outputting a damping force to a window covering system in an adjustable manner while the window covering system is expanding, comprising:

a damping module which comprises a first damping unit and a second damping unit, wherein the first damping unit and the second damping unit are adapted to have a relative motion to generate an interaction force therebetween, by which the damping module outputs the damping force to the window covering system; and an adjusting module connected to the damping module for operating with the damping module simultaneously, wherein the adjusting module is adapted to alter a relative position of the first damping unit and the second damping unit when the first damping unit and the second damping unit have the relative motion, whereby to change the interaction force therebetween and therefore adjust the damping force outputted from the damping module;

wherein the adjusting module comprises a shifting assembly connected to the first damping unit for moving the first damping unit in order to alter the relative position of the first damping unit and the second damping unit;

wherein the adjusting module further comprises a connecting rod with two ends, wherein the shifting assembly is connected to one end and the second damping unit is connected to the other end, whereby the shifting assembly and the second damping unit are configured to operate simultaneously for altering the relative position of the first damping unit and the second damping unit;

wherein the second damping unit comprises a rotation axis, and the second damping unit rotates about the rotation axis; the connecting rod is parallel to the rotation axis of the second damping unit.

2. The damping adjustment device according to claim 1, wherein the shifting assembly is configured to move the first damping unit along a shifting axis of the shifting assembly in an axial direction of the shifting axis in order to alter the relative position of the first damping unit and the second damping unit for changing the interaction force between the first damping unit and the second damping unit.

3. The damping adjustment device according to claim 2, the first damping unit is positioned coaxially with the shifting assembly, wherein the shifting assembly is configured to rotate and drive the first damping unit to rotate about the shifting axis simultaneously.

4. The damping adjustment device according to claim 3, the first damping unit is positioned between the shifting assembly and the second damping unit.

5. The damping adjustment device according to claim 2, wherein the rotation axis of the second damping unit is coaxial to the shifting axis, wherein the second damping unit is configured to operate simultaneously with the shifting assembly, wherein the interaction force between the first damping unit and the second damping unit is changed when the shifting assembly moves the first damping unit relative to the second damping unit in an axial direction of the rotation axis and when the second damping unit rotates about the rotation axis.

6. The damping adjustment device according to claim 2, wherein the rotation axis of the second damping unit is substantially perpendicular to the shifting axis, and the second damping unit is configured to operate simultaneously with the shifting assembly; the shifting assembly is configured to move the first damping unit relative to the second damping unit in a radial direction of the rotation axis while the second damping unit rotates about the rotation axis, whereby the interaction force between the first damping unit and the second damping unit is changed.

7. The damping adjustment device according to claim 2, wherein the interaction force is generated by the first damping unit and the second damping unit within an overlapping area between the first damping unit and the second damping unit, the rotation axis of the second damping unit comprises is substantially perpendicular to the shifting axis, and the second damping unit is connected to the shifting assembly for operating simultaneously with the shifting assembly, wherein the interaction force between the first damping unit and the second damping unit is changed when the second damping unit rotates about the rotation axis and the shifting assembly alters the overlapping area.

8. The damping adjustment device according to claim 2, wherein the shifting assembly further comprises a threaded rod which is parallel or coaxial to the shifting axis, wherein the threaded rod is connected to the first damping unit and configured to drive the first damping unit to move along the shifting axis in an axial direction of the shifting axis, whereby the relative position of the first damping unit and the second damping unit is altered by the shifting assembly in order to change the interaction force between the first damping unit and the second damping unit.

9. The damping adjustment device according to claim 1, wherein one of the first damping unit and the second damping unit comprises a magnetic unit, and the other one of the first damping unit and the second damping unit comprises a conductive unit; the interaction force is an electromagnetic induction force which is generated between the magnetic unit and the conductive unit when the relative motion occurs in between, wherein the electromagnetic induction force is changed when the relative position of the magnetic unit and the conductive unit is altered by the adjusting module.

10. The damping adjustment device according to claim 1, the interaction force is a frictional force generated by the relative motion between the first damping unit and the second damping unit when the first damping unit and the second damping unit are in contact with each other, wherein the frictional force is changed when the relative position of the first damping unit and the second damping unit is altered by the adjusting module.

11. The damping adjustment device according to claim 10, wherein the second damping unit comprises an elastic component which comprises the rotation axis, and the first damping unit comprises an inner wall which is partially frustoconical, wherein the elastic component is in contact with the inner wall; the frictional force is generated between the elastic component and the inner wall by the elastic component rotating about the rotation axis of the elastic component, wherein the frictional force is changed as a radial length of the elastic component is varied by the inner wall when the relative position of the elastic component and the inner wall is altered by the adjusting module.

12. The damping adjustment device according to claim 11, the elastic component comprises an elastic unit and a friction block connected to the elastic unit, wherein the friction block is in contact with the inner wall, whereby the frictional force is generated between the friction block and the inner wall while rotation of the elastic component.

13. The damping adjustment device according to claim 1, the damping module further comprises a fluid between the first damping unit and the second damping unit, wherein the interaction force which is a fluid resistance is generated by the relative motion between the first damping unit and the second damping unit within an overlapping area between the first damping unit and the second damping unit, wherein the fluid resistance is changed when the adjusting module alters the relative position between the first damping unit and the second damping unit and change the overlapping area between the first damping unit and the second damping unit.

14. A window covering system, comprising:
a covering material;
a driving device to be driven by the covering material while the covering material is expanding or collecting; and
a damping adjustment device connected to the driving device, wherein the damping adjustment device comprises a damping module and an adjusting module, wherein the damping module is configured to output a damping force to the driving device, and the damping module comprises a first damping unit and a second damping unit, wherein the first damping unit and the second damping unit are configured to generate an interaction force in between by a relative motion between the first damping unit and the second damping unit while the driving device is driven by expansion of the covering material,
and the adjusting module is connected to the damping module and the driving device, wherein the adjusting module is configured to operate with the damping module simultaneously for adjusting the damping force to the driving device by altering a relative position of the first damping unit and the second damping unit when the relative motion occurs between the first damping unit and the second damping unit;
wherein the adjusting module comprises a shifting assembly connected to the first damping unit and the driving device, wherein the shifting assembly and the driving device are configured to operate simultaneously, wherein the relative position of the first damping unit and the second damping unit is altered by the shifting assembly when the shifting assembly moves the first damping unit;
wherein the adjusting module further comprises a connecting rod with two ends, wherein the shifting assembly is connected to one end and the second damping unit is connected to the other end, wherein the shifting assembly and the second damping unit are configured to operate simultaneously via the connecting rod for altering the relative position of the first damping unit and the second damping unit;
wherein the second damping unit comprises a rotation axis, and the second damping unit rotates about the rotation axis; the connecting rod is parallel to the rotation axis of the second damping unit.

15. The window covering system according to claim 14, wherein the shifting assembly is configured to operate simultaneously with the driving device, and the shifting assembly comprises a shifting axis, wherein the shifting assembly is configured to move the first damping unit along the shifting axis in an axial direction of the shifting axis in order to alter the relative position of the first damping unit and the second damping unit for changing the interaction force between the first damping unit and the second damping unit.

16. The window covering system according to claim 15, wherein the driving device comprises a driving axis positioned in a way selected from the following: substantially perpendicular to the shifting axis of shifting assembly, substantially parallel to the shifting axis of shifting assembly, or coaxially to the shifting axis of shifting assembly.

17. The window covering system according to claim 16, the first damping unit is positioned coaxially with the shifting assembly, wherein the shifting assembly is configured to rotate and drive the first damping unit to rotate about the shifting axis simultaneously when the shifting assembly is driven by the driving device.

18. The window covering system according to claim 17, the first damping unit is positioned between the shifting assembly and the second damping unit, and the shifting assembly is positioned between the second damping unit and the driving device.

19. The window covering system according to claim 16, wherein the rotation axis of the second damping module is coaxial to the shifting axis and the driving axis, and the shifting assembly is configured to operate simultaneously with the driving device, wherein the interaction force between the first damping unit and the second damping unit is changed when the shifting assembly moves the first damping unit relative to the second damping unit in an axial direction of the rotation axis and the second damping unit is driven by the driving device to rotate about the rotation axis.

20. The window covering system according to claim 16, wherein the rotation axis of the second damping unit and the driving axis are substantially perpendicular to the shifting axis, and the second damping unit is configured to operate simultaneously with the shifting assembly and the driving device, wherein the interaction force between the first damping unit and the second damping unit is changed when the shifting assembly moves the first damping unit relative to the second damping unit in an radial direction of the rotation axis and the second damping unit is driven by the driving device to rotate about the rotation axis.

21. The window covering device according to claim 16, wherein the interaction force is generated by the first damping unit and the second damping unit within an overlapping area between the first damping unit and the second damping unit; the rotation axis of the second damping unit and the driving axis are substantially perpendicular to the shifting axis, and the second damping unit, the shifting assembly and the driving device are configured to operate simultaneously, wherein the interaction force between the first damping unit and the second damping unit is changed when the driving device drives the second damping unit and the shifting assembly to operate such that the second damping unit rotates about the rotation axis and the shifting assembly alters the overlapping area by moving the first damping unit.

22. The window covering system according to claim 15, wherein the shifting assembly further comprises a threaded rod which is parallel or coaxial to the shifting axis, wherein the threaded rod is connected to the first damping unit and configured to drive the first damping unit to move in an axial direction of the shifting axis, whereby the relative position of the first damping unit and the second damping unit is altered by the shifting assembly for changing the interaction force.

23. The window covering system according to claim 14, wherein one of the first damping unit and the second damping unit comprises a magnetic unit, and the other one of the first damping unit and the second damping unit comprises a conductive unit; the interaction force is an electromagnetic induction force which is generated between the magnetic unit and the conductive unit which are driven to operate by the driving device when the relative motion occurs in between, wherein the electromagnetic induction force is changed when the relative position of the magnetic unit and the conductive unit is altered by the adjusting module which is driven to operate by the driving device.

24. The window covering system according to claim 14, the interaction force is a frictional force generated by the relative motion between the first damping unit and the second damping unit which are driven by the driving device while the first damping unit and the second damping unit are in contact with each other; the frictional force is changed when the relative position of the first damping unit and the second damping unit is altered by the adjusting module which is driven to operate by the driving device.

25. The window covering system according to claim 24, wherein the second damping unit comprises an elastic component which comprises the rotation axis, and the first damping unit comprises an inner wall which is partially frustoconical, wherein the elastic component is in contact with the inner wall; the frictional force is generated between the elastic component and the inner wall by the elastic component rotating about the rotation axis of the elastic component, wherein the frictional force is changed as a radial length of the elastic component is varied by the inner wall when the relative position of the elastic component and the inner wall is altered by the adjusting module.

26. The window covering system according to claim 25, the elastic component comprises an elastic unit and a friction block connected to the elastic unit, wherein the friction block is in contact with the inner wall, whereby the frictional force is generated between the friction block and the inner wall while rotation of the elastic component.

27. The window covering system according to claim 14, the damping module further comprises a fluid between the first damping unit and the second damping unit, wherein the interaction force is a fluid resistance which is generated by the relative motion between the first damping unit and the second damping unit within an overlapping area between the first damping unit and the second damping unit when the first damping unit and the second damping unit are driven by the driving device, wherein the fluid resistance is changed when the driving device drives the adjusting module to alter the relative position between the first damping unit and the second damping unit and change the overlapping area between the first damping unit and the second damping unit.

28. The window covering system according to claim 14, further comprising:
  an unidirectional controller connected between the driving device and the damping module, wherein the unidirectional controller is driven by the driving device to rotate in a first direction while the covering material is expanding, wherein the unidirectional controller is configured to drive the relative motion between the first damping unit and the second damping unit of the damping module which outputs the damping force to the driving device;

the driving device rotates in a second direction which is opposite to the first direction while the covering material is collecting, wherein the driving device rotates freely in the second direction independently of the damping module due to the unidirectional controller.

29. The window covering system according to claim 14, further comprising:
an accelerator connected between the driving device and the damping module, wherein speed of the relative motion is greater than speed of the driving device when the damping module is driven by the driving device via the accelerator.

30. The window covering system according to claim 14, wherein
the driving device is connected to an upper end of the covering material, wherein the driving device operates for driving the damping module to output the damping force to the driving device while the covering material is expanding, wherein, as the driving device keeps operating, the adjusting module increases the interaction force between the first damping unit and the second damping unit, whereby to increase the damping force from the damping module.

31. The window covering system according to claim 14, further comprising:
a headrail, a bottom rail, and a lift cord, wherein the covering material is positioned between the headrail and the bottom rail, wherein one end of the lift cord is connected to the bottom rail, and the other end of the lift cord is connected to the driving device through the covering material;
wherein the driving device operates for driving the damping module to output the damping force to the driving device while the covering material is expanding, wherein, as the driving device keeps operating, the adjusting module reduces the interaction force between the first damping unit and the second damping unit, whereby to reduce the damping force from the damping module.

* * * * *